United States Patent
Rosenkranz et al.

(10) Patent No.: US 12,468,975 B2
(45) Date of Patent: Nov. 11, 2025

(54) METHOD FOR REDUCING QUANTUM CIRCUIT DEPTH FOR AMPLITUDE ESTIMATION

(71) Applicant: Quantinuum Ltd, Carlisle Place (GB)

(72) Inventors: Matthias Rosenkranz, Cambridge (GB); Michael Lubasch, Orpington (GB); Mattia Fiorentini, London (GB); Kirill Plekhanov, London (GB)

(73) Assignee: Quantinuum Ltd, London (GB)

( * ) Notice: Subject to any disclaimer, the term of this patent is extended or adjusted under 35 U.S.C. 154(b) by 681 days.

(21) Appl. No.: 17/930,339

(22) Filed: Sep. 7, 2022

(65) Prior Publication Data

US 2023/0385677 A1 Nov. 30, 2023

(30) Foreign Application Priority Data

Sep. 8, 2021 (GB) ..................... 2112786

(51) Int. Cl.
*G06N 10/60* (2022.01)
*G06N 10/40* (2022.01)
(Continued)

(52) U.S. Cl.
CPC ............. *G06N 10/60* (2022.01); *G06N 10/40* (2022.01); *G06N 10/80* (2022.01); *G06N 20/00* (2019.01)

(58) Field of Classification Search
CPC ........ G06N 10/60; G06N 10/40; G06N 10/80; G06N 20/00
(Continued)

(56) References Cited

U.S. PATENT DOCUMENTS

| 6,449,580 B1 * | 9/2002 | Bardetsky | .......... G01N 33/2888 |
| | | | 702/130 |
| 11,558,069 B1 * | 1/2023 | Sparrow | ................ G06N 10/40 |
| | | | 702/136 |

(Continued)

FOREIGN PATENT DOCUMENTS

| WO | WO2020/168158 A1 * | 8/2020 | ................ G06N 3/04 |
| WO | WO 2021/050541 A1 * | 3/2021 | ............. G06N 99/00 |

OTHER PUBLICATIONS

Aaronson et al., 2020, Quantum approximate counting, simplied, in Symposium on Simplicity in Algorithms (SIAM, 2020) pp. 24-32.
(Continued)

*Primary Examiner* — Shahid A Alam
(74) *Attorney, Agent, or Firm* — KNOBBE, MARTENS, OLSON & BEAR, LLP

(57) ABSTRACT

A quantum computing system includes a classical computer coupled in combination with a quantum computing system, wherein the quantum computing system is configurable to execute program instructions to process input data to generate corresponding output data. The quantum computing system is configured to execute a variational quantum amplitude estimation (VQAE) algorithm by iteratively executing a sequence of quantum operations including a maximum likelihood amplitude estimation and performing a variational approximation after an iteration to determine a variational quantum state associated with the outcome of the maximum likelihood amplitude estimation. The quantum computing system may also execute an adaptive VQAE by performing a rescaling process to reduce the variational cost of the VQAE.

20 Claims, 12 Drawing Sheets

(51) Int. Cl.
 G06N 10/80 (2022.01)
 G06N 20/00 (2019.01)
(58) Field of Classification Search
 USPC .......................................................... 706/62
 See application file for complete search history.

(56) References Cited

U.S. PATENT DOCUMENTS

2021/0044305 A1* 2/2021 Niu ........................ H03M 13/13
2021/0049493 A1* 2/2021 Vivoli ..................... G06F 17/14

OTHER PUBLICATIONS

Aharonov et al., 2009, A polynomial quantum algorithm for approximating the Jones polynomial, Algorithmica 55:395-421.
Amaro et al., Jun. 18, 2021, Filtering variational quantum algorithms for combinatorial optimization, arXiv:2106.10055v1, 12 pp.
Arouna, 2004, Adaptative Monte Carlo Method, a Variance Reduction Technique, Monte Carlo Methods Appl. 10, 1.
Banchi et al., Jan. 19, 2021, Measuring analytic gradients of general quantum evolution with the stochastic parameter shift rule, arXiv:2015/10299v2 [quant-ph], 14 pp.
Benedetti et al., 2019, Parameterized quantum circuits as machine learning models, Quantum Sci. Technol. 4:043001, 20 pp.
Benedetti et al., 2021, Hardware efficient variational quantum algorithms for time evolution, Phys. Rev. Research 3, 033083.
Benedetti et al., Mar. 11, 2021, Variational inference with a quantum computer, arXiv:2103.06720v1 [quant-ph], 17 pp.
Bharti et al., Oct. 12, 2020, Iterative quantum assisted Eigensolver, arXiv:2010.05638v1 [quant-ph], 10 pp.
Bharti et al., Oct. 6, 2021, Noisy intermediate-scale quantum (NISQ) algorithms, arXiv:2101.08448 [quant-ph], 91 pp.
Bonyadi et al., 2017, Particle Swarm Optimization for Single Objective Continuous Space Problems: A Review, Evol. Comput. 25(1):1-54.
Bouland et al., Nov. 12, 2020, Prospects and challenges of quantum finance, arXiv:2011.06492v1 [q-fin.CP], 49 pp.
Brassard et al., 1997, An exact quantum polynomial-time algorithm for Simon's problem, Proceedings of the Fifth Israeli Symposium on Theory of Computing and Systems (IEEE, 1997) pp. 12-23.
Brassard et al., 2002, Quantum amplitude amplification and estimation, Contemp. Math. 305, 53.
Braun et al., Mar. 9, 2021, A Quantum Algorithm for the Sensitivity Analysis of Business Risks, arXiv:2103.05475v1 [quant-ph], 21 pp.
Cerezo et al., 2021, Cost function dependent barren plateaus in shallow parameterized quantum circuits, Nat. Commun, 12:1791.
Cerezo et al., Dec. 16, 2020, Variational Quantum Algorithms, arXiv:2012.09265 [quant-ph], 29 pp.
Egger et al., 2020, Quantum Computing for Finance: State-of-the-Art and Future Prospects, IEEE Trans. Quantum Eng. 1:1-24.
Giurgica-Tiron et al., Dec. 6, 2020, Low depth algorithms for quantum amplitude estimation, arXiv:2012.03348v1 [quant-ph], 27 pp.
Grinko et al., 2021, Iterative quantum amplitude estimation, npj Quantum Inf. 7:52, 6 pp.
Grover, May 11, 1998, Quantum computers can search rapidly by using almost any transformation, Phys. Rev. Lett. 80(19):4329-4332.
Hazan et al., May 2014, Beyond convexity: Stochastic quasi-convex optimization, arXiv:1507.02030v2 [cs.LG], 23 pp.
Herbert, Dec. 10, 2021, Quantum Monte-Carlo Integration: The Full Advantage in Minimal Circuit Depth, arXiv:2105.09100 [quant-ph], 17 pp.
Kassal et al., Dec. 2, 2008, Polynomial-time quantum algorithm for the simulation of chemical dynamics, Proc. Natl. Acad. Sci. USA 105(48):18681-18686.
Kennedy et al., 1995, Particle swarm optimization, in Proceedings of ICNN'95—International Conference on Neural Networks, 4:1942-1948.

Kerenidis et al., 2019, q-means: A quantum algorithm for unsupervised machine learning, 33rd Conference on Neural Information Processing Systems (NeurIPS 2019), Vancouver, Canada, 11 pp.
Kingma et al., Dec. 22, 2014, Adam: A Method for Stochastic Optimization, arXiv:1412.6980v1 [cs.LG], 9 pp.
Klymko et al., Apr. 7, 2021, Real time evolution for ultracompact Hamiltonian eigenstates on quantum hardware, arXiv:2103.08563v3 [quant-ph], 19 pp.
Knill et al., 2007, Optimal quantum measurements of expectation values of observables, Phys. Rev. A 75, 012328, 13 pp.
Lau et al., Aug. 15, 2021, Noisy intermediate scale quantum simulation of time dependent Hamiltonians, arXiv:2101/07677v2 [quant-ph], 15 pp.
Li et al., Jan. 19, 2017, Hybrid Quantum-Classical Approach to Quantum Optimal Control, arXiv:1608.00677v4 [quant-ph], 8 pp.
Liu et al., Dec. 13, 2020, An efficient adaptive variational quantum solver of the Schrodinger equation based on reduced density matrices, arXiv:2012.07047v1 [quant-ph], 27 pp.
Low et al., 2014, Quantum inference on Bayesian networks, Phys. Rev. A 89:062315, pp. 1-7.
Mitarai et al., 2018, Quantum circuit learning, Phys. Rev. A 98, 032309.
Montanaro, 2015, Quantum speedup of Monte Carlo methods, Proc. Math. Phys. Eng. Sci. 471.
Nakanishi et al., 2020, Sequential minimal optimization for quantum-classical hybrid algorithms, Phys. Rev. Research 2:043158, pp. 1-10.
Orus et al., 2019, Quantum computing for _nance: Overview and prospects, Rev. Phys. 4, 100028.
Ostaszewski et al., Jan. 27, 2021, Structure optimization for parameterized quantum circuits, arXiv:1905.09692v2 [quant-ph], 13 pp.
Parrish et al., 2019, Quantum Filter Diagonalization: Quantum Eigendecomposition without Full Quantum Phase Estimation, arXiv:1909.08925 =v1 [quant-ph], 10 pp.
Parrish et al., Apr. 5, 2019, A Jacobi Diagonalization and Anderson Acceleration Algorithm For Variational Quantum Algorithm Parameter Optimization, arXiv:1904.03206v1 [quant-ph], 31 pp.
Plekhanov et al., Feb. 28, 2022, Variational quantum amplitude estimation, arXiv:2109.03687v2 [quant-ph], 11 p.
Pogorelov et al., Jun. 7, 2021, A compact ion-trap quantum computing demonstrator, arXiv:2101.11390v3 [quant-ph], 22 pp.
Press et al., 1992, Numerical Recipes in C: The Art of Scientific Computing, Second Ed., Cambridge University Press, New York, USA (TOC).
Rebentrost et al., 2018, Quantum computational finance: Monte Carlo pricing of financial derivatives, Phys. Rev. A 98, 022321.
Schuld et al., 2019, Evaluating analytic gradients on quantum hardware, Phys. Rev. A 99, 032331.
Stair et al., 2020, A Multireference Quantum Krylov Algorithm for Strongly Correlated Electrons, J. Chem. Theory Comput. 16:2236-2245.
Stamatopoulos et al., Jul. 2, 2020, Option Pricing using Quantum Computers, arXiv:1905.02666v5 [quant-ph], 20 pp.
Suzuki et al., 2020, Amplitude estimation without phase estimation, Quantum Inf. Process. 19:75, 17 pp.
Suzuki et al., 2021, Normalized Gradient Descent for Variational Quantum Algorithms, arXiv:2106.10981v1 [quant-ph], 9 pp.
Tanaka et al., Oct. 11, 2021, Amplitude estimation via maximum likelihood on noisy quantum computer, arXiv:2006.16223v3 [quant-ph], 28 pp.
van den Berg et al., Sep. 5, 2020, Circuit optimization of Hamiltonian simulation by simultaneous diagonalization of Pauli clusters, arXiv:2003.13599v1 [quant-ph], 28 pp.
Vidal et al., Dec. 31, 2018, Calculus on parameterized quantum circuits, arXiv:1812.06323v2 [quant-ph].
Wiebe et al., 2016, Quantum Deep Learning, Quantum Info. Comput. 16(7&8):0541-0587.
Wiebe et al., Jul. 18, 2014, Quantum Algorithms for Nearest-Neighbor Methods for Supervised and Unsupervised Learning, Quantum Information and Computation, 15(3&4):0316-0356.

(56) References Cited

OTHER PUBLICATIONS

Woerner et al., 2019, Quantum risk analysis, npj Quantum Inf. 5:15, 8 pp.
Extended European search report dated Jan. 16, 2023 in application No. 22194462.2, 9 pp.

* cited by examiner

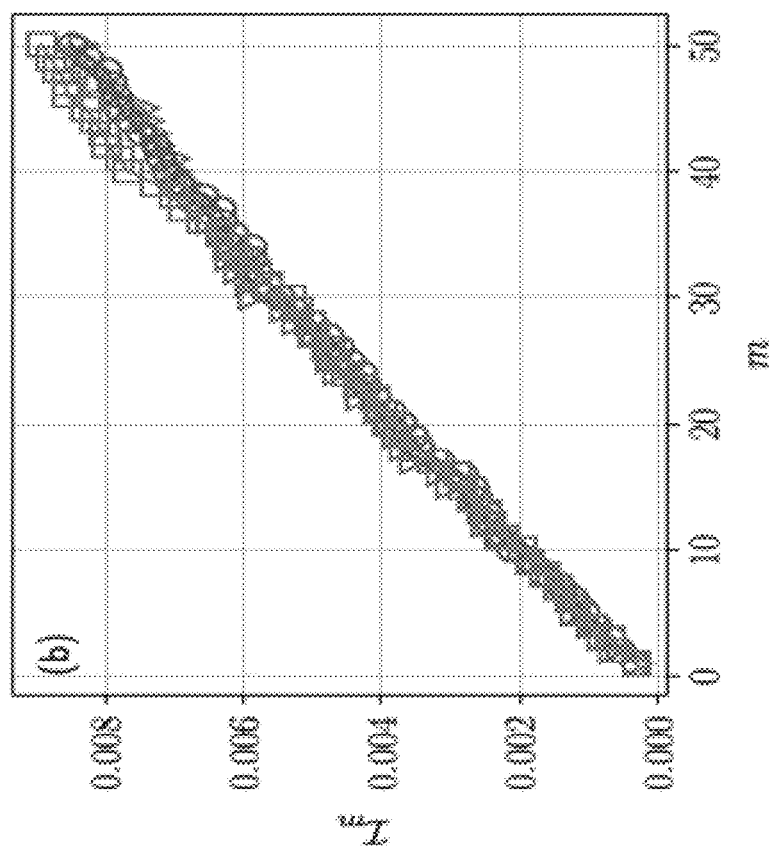
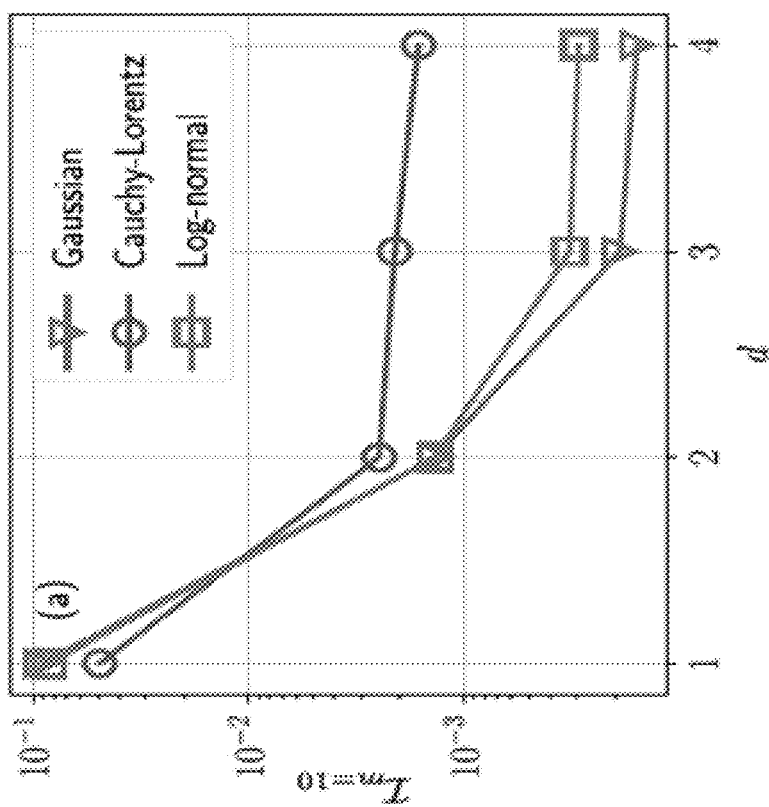
FIG. 8B
FIG. 8A

METHOD FOR REDUCING QUANTUM CIRCUIT DEPTH FOR AMPLITUDE ESTIMATION

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Technical Field

The present disclosure relates to quantum computing systems, in particular to quantum computing systems including qubit readout arrangements that are configured to reduce quantum noise arising during certain computational tasks executed by the quantum computing systems. Moreover, the present disclosure relates to methods for operating quantum computing systems including qubit readout arrangements to reduce quantum noise arising in the quantum circuit when certain computational tasks are executed by the quantum computing systems. Furthermore, the present disclosure relates to software products, for example stored in a non-transitory memory, wherein the software products are executable on quantum computing hardware to implement aforesaid methods.

Description of Related Art

Classical binary computers rely on Silicon-based semiconductor devices. Moreover, the classical binary computers have become progressively more powerful in recent years as integrated circuit minimum lateral feature sizes have approached 10 nm and smaller. As integrated circuit minimum lateral feature sizes are reduced to 5 nm and smaller, silicon integrated circuits experience significant quantum effects, such that further miniaturization may not be practical. It has been appreciated that a paradigm shift in computer technology can allow increases in computing power to continue. This paradigm shift has resulted in the innovation of quantum computing systems that exploit quantum phenomena such as superposition and entanglement to increase the computation speed compared to classical computers and enable solving computationally complex problems within timeframes suitable for practical applications.

SUMMARY

The present disclosure seeks to provide a technical solution to a technical problem of quantum noise arising when qubits (e.g., an array of qubits) are subject to a sequence of quantum operations performed by quantum circuits of a quantum computing system, to generate corresponding processed qubits. Moreover, the present disclosure seeks to provide a technical solution to noise arising in a measuring device of the quantum computing system that is used to read out values of the processed qubits of the quantum computing system; the technical solution is concerned with configuring the quantum computing system to perform additional operations (e.g., on the processed qubits), estimations (e.g., on the measured state of the qubits), and calculations that can reduce quantum noise arising from fundamental physical effects occurring in the quantum circuits, measuring device, or qubits, while performing a quantum computational task to provide results having an error that is below a target error.

According to a first aspect, there is provided a quantum computing system including:

(i) an array of qubits that is configured to be provided with initial values depending on input data supplied in use to the quantum computing system;

(ii) a quantum computing arrangement and/or a quantum circuit that is configured to execute a sequence of quantum operations on the array of qubits to generate corresponding processed qubits; and (iii) a measuring device for determining states of the processed qubits to generate measurement data or final measurement data (for example, the quantum computing system may use the final measurement data to generate output data comprising results of a computational task (e.g., quantum computational task)), characterized in that the quantum computing system is configured to use a variational quantum amplitude estimation process in at least one of the sequence of operations and the measuring device when determining the states of the processed qubits to reduce an effect of quantum noise that arises when executing the sequence of quantum operations on the qubits and determining the states of the processed qubits.

The first aspect provides a quantum computing system that is of advantage in that use of the variational quantum amplitude estimation process enables quantum noise arising during the quantum computational task to be reduced.

Optionally, the quantum computing system is configured to receive the input data representative of sensed data from a physical system, and the sequence of quantum operations is arranged to process the qubits so that the output data from the quantum computing system is representative of state or characteristic of the physical system. Thus, the quantum computing system is coupled to a sensor arrangement for measuring the physical system, and the quantum computing system is combination with the sensor arrangement form a measurement apparatus for sensing physical characteristics of the physical system. Use of the variational quantum amplitude estimation process enables the characteristics of the physical system to be determined to a greater accuracy by reducing processing noise then input data.

Optionally, in the quantum computing system, the variational quantum amplitude estimation process is implemented as an adaptive variational amplitude estimation process that is adaptive, e.g., to characteristics of the sequence of operations when applied to the qubits and/or to characteristics of the measuring device when determining the states of the processed qubits. More optionally, in the quantum computing system, the adaptive variational amplitude estimation process includes a maximum likelihood process, e.g., for learning characteristics of the sequence of operations when applied to the qubits and to characteristics of the measuring device when determining the states of the processed qubits. Yet more optionally, in the quantum computing system, the maximum likelihood process is implemented as an iterative process applied to the qubits of the quantum computing system.

According to a second aspect, there is provided a method for operating a quantum computing system, characterized in that the method includes:

(i) arranging for the quantum computing system to include an array of qubits that is configured to be provided with initial values depending on input data supplied in use to the quantum computing system;

(ii) configuring a quantum computing arrangement and/or quantum circuit to execute a sequence of quantum operations on the array of qubits to generate corresponding processed qubits; and (iii) using a measuring device to determine states of the processed qubits to generate measurement data or final measurement data (for example, the quantum computing system may use the final measurement data to generate output data comprising results of a computational task (e.g., quantum computational task)), characterized in that the method further includes configuring the quantum computing system to use a variational quantum amplitude estimation process in at least one of the sequence of operations and the measuring device when determining the states of the processed qubits to reduce an effect of quantum noise that arises when executing the sequence of quantum operations on the qubits and determining the states of the processed qubits.

Optionally, the method includes configuring the quantum computing system to receive the input data representative of sensed data from a physical system and arranging for the sequence of quantum operations to process the qubits so that the output data from the quantum computing system is representative of state or characteristic of the physical system. More optionally, the method includes implementing the variational quantum amplitude estimation process as an adaptive variational amplitude estimation process that is adaptive, e.g., to characteristics of the sequence of operations when applied to the qubits and/or to characteristics of the measuring device when determining the states of the processed qubits. Yet more optionally, the method includes arranging for the adaptive variational amplitude estimation process to include a maximum likelihood process, e.g., for learning characteristics of the sequence of operations when applied to the qubits and/or to characteristics of the measuring device when determining the states of the processed qubits. Yet more optionally, in the method, the maximum likelihood process is implemented as an iterative process applied to the qubits of the quantum computing system.

In a third aspect, embodiments of the present disclosure provide a computer program product comprising a non-transitory computer-readable storage medium having computer-readable instructions stored thereon, the computer-readable instructions being executable by a computerized device comprising processing hardware to execute the method pursuant to the aforementioned second aspect.

In some embodiments, the present disclosure may reduce the quantum noise generated during certain quantum computational tasks performed by a quantum computer. In some cases, a quantum computational task may comprise generating a result (e.g., an amplitude estimation) having an error below a threshold error. In some cases, the quantum computer can be part of a hybrid quantum computing system comprising one or more classical computing systems (e.g., classical computers, control systems, processing systems, and the like). In various embodiments, the quantum noise may arise within qubits when subject to a sequence of quantum operations to generate corresponding processed qubits, and noise arising in a measuring device that is used to read out values of the processed qubits. The technical solution is concerned with reducing a total number of sequential quantum operations used to perform the corresponding quantum computational task. In some cases, the technical solution may include performing additional operations (e.g., measurement and classical operations) on processed qubits resulting from a given number of quantum operations performed in series. In some cases, executing a sequence of quantum operations may be associated with a maximum likelihood amplitude estimation algorithm. In some embodiments, the quantum computational task may comprise performing quantum amplitude estimation. In some cases, additional operations may comprise a variational approximation or an adaptive variational approximation.

A quantum computing system may include a classical computer coupled in combination with a quantum computing system, wherein the quantum computing system is configurable to execute program instructions to process input data to generate corresponding output data, wherein the program instructions include a combination of variational approximation and maximum likelihood amplitude estimation to be executed using the quantum computing system, wherein the quantum computing system (e.g., the classical computer of the quantum computing system) is configured to use the quantum computing system by using one or more quantum circuits acting on an array of qubits, and to process measurement data from the one or more quantum circuits to generate the corresponding output data comprising estimated quantum amplitudes. In some cases, variational approximation may comprise a variational approximation algorithm. In some cases, variational approximation may comprise a variational optimization. In some cases, the classical computer is in communication with the quantum computing system and executes program instructions that are stored in a non-transitory memory of the quantum computing system. In some cases, the non-transitory memory can be a memory of the classical computer. The classical computer can be a binary data computer implemented based on electronic circuits (e.g., Silicon-based integrated circuits).

According to a fourth aspect, there is provided a quantum computing system configured to perform a quantum computational task, the quantum computing system including a quantum computer comprising: an array of qubits, at least one quantum circuit comprising one or more quantum gates configured to act on the qubits to generate processed qubits, and at least one measuring device configured to determine states of the processed qubits to generate measurement data. The quantum computing system further comprises a classical computing system in communication with the quantum computer, the classical computing system comprising a non-transitory memory configured to store specific computer-executable instructions and a hardware processor in communication with the non-transitory memory, where the hardware processor is configured to execute the specific computer-executable instructions to at least: receive input data, prepare the array of qubits based at least in part on the input data, configure the at least one quantum circuit, based at least in part on the input data, to execute at least a series of quantum operations on the array of qubits to generate final processed qubits, perform at least a first variational approximation after at least a first sequence of quantum operations of the series of quantum operations, to generate a first variational quantum state based at least in part on the measurement data generated after the first sequence of quantum operations, execute, using at least the first variational quantum state, at least a second sequence of quantum operations of the series of quantum operations to generate the final processed qubits; and generate output data using the final processed qubits. Performing the first variational approximation reduces quantum noise arising from performing the quantum computational task and generating the output data compared to quantum noise arising from performing the quantum computational task and generating the output data without performing the first variational approximation.

According to fifth aspect, there is provided a method for operating a quantum computing system including:
a quantum computer having an array of qubits,
a non-transitory memory configured to store specific computer-executable instructions, and
a hardware processor in communication with the non-transitory memory, the method comprising:
by the hardware processor of the computing system:
a) receiving input data,
b) preparing the array of qubits based at least in part on the input data;
c) configuring a quantum circuit in the quantum computer, based at least in part on the input data, to execute at least a series of quantum operations on the array of qubits to generate final processed qubits;
d) performing at least a first variational approximation, after at least a first sequence of quantum operations of the series of quantum operations, to generate a first variational quantum state based at least in part on a measured quantum state of the array of qubits after the first sequence of quantum operations;
e) executing, using the first variational quantum state, at least a second sequence of quantum operations of the series of quantum operations to generate the final processed qubits; and
f) generating output data using the final processed qubits.

Operating the computing system comprises performing a quantum computational task, where performing the quantum computational task comprises at least executing the series of quantum operations. Performing the first variational approximation reduces quantum noise arising from performing the quantum computational task and generating the output data compared to quantum noise arising from performing the quantum computational task and generating the output data without performing the first variational approximation.

The computational task may comprise quantum amplitude estimation (QAE), wherein the input data may comprise: a real valued function, a probability distribution, and a number of quantum operations in the first sequence of quantum operations. The output data may comprise an estimated quantum amplitude having an amplitude estimation error that are smaller than a threshold error. In some cases, the output data may further comprise an expectation value of a real valued function with respect to a probability distribution.

The method of the fifth aspect herein referred to as Variational Quantum Amplitude Estimation (VQAE) is of advantage in that configuring the quantum computing system to perform quantum amplitude estimation with a reduced quantum circuit depth reduces quantum noise compared to existing methods. In some cases, a maximum depth of the quantum circuits used for performing a computational task (e.g., quantum amplitude estimation) may be independent of a total number of amplitude estimation steps (e.g., maximum likelihood amplitude estimation steps). In some cases, a maximum depth of the quantum circuits used for performing a computational task (e.g., quantum amplitude estimation) may be independent of a threshold or target amplitude estimation error set for completion of the computational task.

According to a sixth aspect, there is provided a non-transitory computer-readable storage medium comprising specific computer-readable instructions executable on data processing hardware, wherein the specific computer-readable instructions, when executed the data processing hardware, implement the method of the fifth aspect.

Additional aspects, advantages, features and objects of the present disclosure would be made apparent from the drawings and the detailed description of the illustrative embodiments construed in conjunction with the appended claims that follow. It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and apparatus disclosed herein. Moreover, those in the art will understand that the drawings are not to scale. Wherever possible, like elements have been indicated by identical numbers.

Embodiments of the present disclosure will now be described, by way of example only, with reference to the following patent diagrams wherein:

FIGS. 8A and 8B are illustrations of infidelity for the shifted Lorentzian (red circles), Gaussian (green triangles), and log-normal (purple squares) probability distributions plotted as a function of d for m=10 (A) and as a function of m for d=4 (B).

Figure 1:
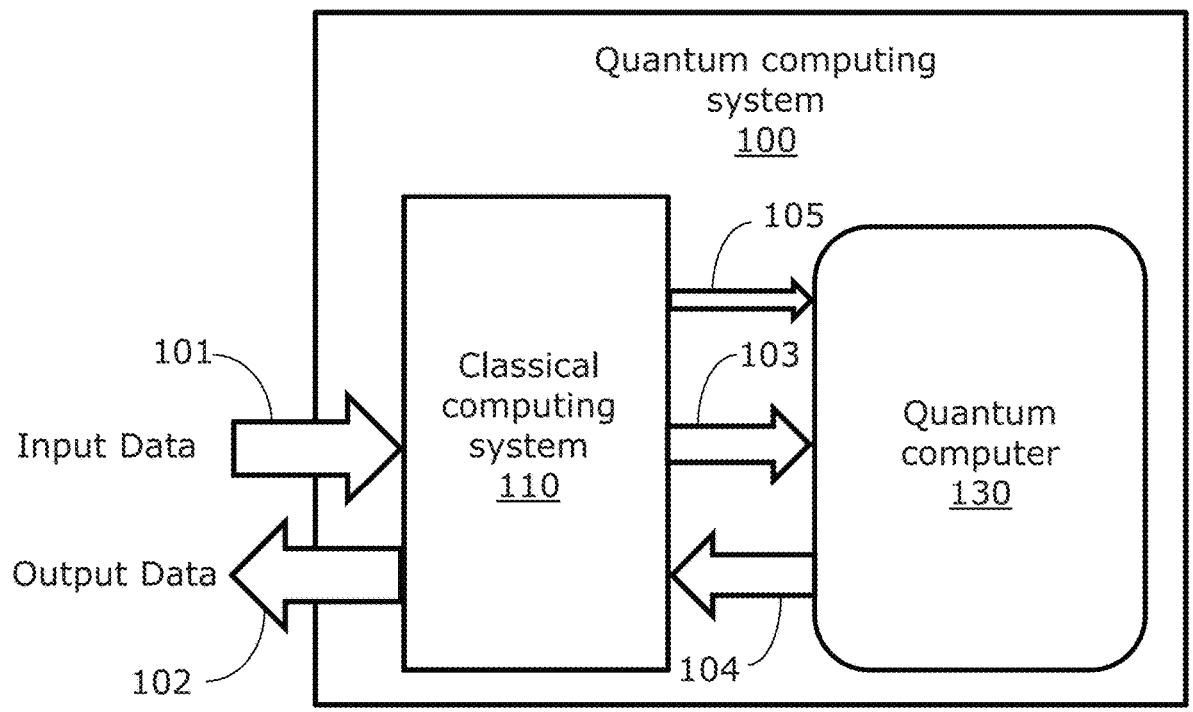
FIG. 1 is an illustration of a quantum computing system of the present disclosure, wherein the quantum computing system is a hybrid combination of a classical computer and a quantum computing system.

In the accompanying diagrams, an underlined number is employed to represent an item over which the underlined number is positioned or an item to which the underlined number is adjacent. When a number is non-underlined and accompanied by an associated arrow, the non-underlined number is used to identify a general item at which the arrow is pointing.

DETAILED DESCRIPTION

Introduction

In general overview, contemporary computing hardware, for example configured to use Silicon-based integrated circuits and associated data memory devices for performing data processing, becomes more computationally powerful and faster as feature sizes of its integrated circuits become smaller. As circuit feature sizes approach nanometre-scale, Heisenberg's uncertainty principle and quantum effects become more significant in integrated circuit design and operation. In the limit, using single particles, for example ions or photons, to represent data, namely in a form of qubits, represents a limit of miniaturization and provides a fastest computing performance, especially when phenomena such as superposition and entanglement are used; such an approach is used in contemporary quantum computers. A general introduction to quantum computation and quantum information is provided in a scientific publication "*Quantum computations and quantum information*", Nagy et al., The International Journal of Parallel, Emergent and Distributed Systems, Vol 21, No. 1, Feb 2006, pp. 1-59.

In some cases, quantum computers and quantum computing systems may exploit the quantum nature of fields and particles to increase the computation speed compared to classical computers to enable solving computationally complex problems within timeframes suitable for practical applications. In classical processing of data, wherein the data is representative of real physical signals for example, many mathematical operations such as computations of means, correlations, Fourier transforms, Hadamard transforms and so forth are used for processing the data. The data to be processed may be considerable in size, for example Terabytes of information, even potentially Petabytes of information, for example acquired from sensor arrays, for example sequentially over a period of time. Processing time and associated latency for processing the data are important factors, for example in real-time control situations. A quantum computer is potentially capable of being configured to process large quantities of data in a highly efficient manner However, a challenging contemporary technical problem is how to configure quantum computers in a most optimal manner to implement such data processing. For example, given a level noise generated by different elements of a quantum circuit, how the quantum computer should be used to perform a computational task (e.g., quantum computational task) is a technical problem, such that the noise generated during the computations does not impose a limit on the minimum computational error that can be achieved.

It is known practice to use a combination of a classical computer and a quantum computer when seeking to solve extremely complex problems; in the present disclosure, such a combination will be referred to as a quantum computing system. The classical computer uses Silicon integrated circuit devices that are configured to operate at substantially room temperature (circa +20° C.), whereas the quantum computer is configured to be cooled to cryogenic temperatures (circa −273° C.) in order to function most effectively. When tackling a given computing task, the task can be divided between execution on the classical computer and execution on the quantum computer. Moreover, for certain tasks, the classical computer will be more efficient than the quantum computer for handling simple computational tasks, whereas the quantum computer can potentially solve certain types of computation tasks that would be inefficient to perform on the classical computer. However, transferring tasks between the classical computer and the quantum computer has temporal overhead that is preferably reduced as much as possible in order to achieve an optimal computing performance for the quantum computing system.

When using such a tandem configuration of a classical computer and quantum computer, it is sometimes convenient, for example to enhance data processing throughput, to perform certain arithmetic computations on the quantum computer rather than on the classical computer. A technical problem that arises therefrom is how to configure a quantum computer most effectively for performing certain types of arithmetic computations in a manner that noise generated during the quantum computation does not impose a constraint on a total number of quantum operations that can be performed for a quantum computational task. Thus, some embodiments of the present disclosure are concerned with addressing a technical problem of configuring a classical computing system coupled in tandem with quantum computer in a manner to provides for more efficient computation of input data to generate corresponding processed output data, and also to reduce a computational error of the processed output data while keeping the quantum noise arising in the quantum computer below a threshold value.

Quantum Computation System

In FIG. 1, there is shown a schematic diagram of a quantum computing system 100. In some examples, the quantum computing system 100 may receive input data 101 from a data source and generate output data 102. In some cases, the input data 101 may comprise a real valued function and the output data 102 may comprise an expectation value of the real valued function with respect to a probability distribution. In some embodiments, the output data 102 may comprise an estimated quantum amplitude having an error below a threshold error. In some implementations, the quantum computing system 100 may include at least a classical computing system 110 (also referred to as being a classical computer or binary data computer) and a quantum computer 130 in communication with the binary data computer. In some cases, the classical computing system 110 may be in communication with the quantum computer 130. In some examples, the classical computing system 110 may be coupled in combination with the quantum computer 130. The classical computing system 110 may exchange data with the quantum computer 130 via one or more data links; the data links may, for example, be provided via use of a data highway. In some examples, the classical computing system 110 may comprise a non-transitory memory and at least one electronic processor configured to execute computer-executable instructions (e.g., software instructions, or program instructions) stored in the non-transitory memory. In some examples, the electronic processor may be implemented using Silicon integrated circuits that perform binary digital computations when is use. The one or more data processors can be configured to execute software instructions for processing the input data 101 to generate the output data 102 with assistance from a quantum computer 130 that is coupled to the classical computing system 110.

The memory may be a non-volatile memory, such as flash memory, a hard disk, magnetic disk memory, optical disk memory, or any other type of non-volatile memory. Furthermore, types of memory may include but are not limited to random access memory ("RAM") and read-only memory ("ROM"). In some examples, the classical computing system 110 can be programmed to perform different procedures each implemented based on a different set of instructions.

In some cases, the electronic processor of the classical computing system 110 may execute the computer-executable instructions to receive input data 101 from a data source (e.g., from a sensor or a sensor network), to process the input data 101 to generate quantum computer input data 103, and to transmit the quantum computer input data 103 to the quantum computer 130. Additionally, the electronic processor of the classical computing system 110 may send configuration data 105 that is usable for configuring the quantum computer 130 (e.g., for configuring one or more quantum gates of the quantum computer 130). In some cases, the configuration data 105 may be stored in a memory of the classical computing system 110. In some other cases, electronic processing of the classical computing system 110 may generate configuration data 105 based at least in part on the data stored in a memory of the classical computing system 110. In some cases, the configuration data 105 may be provided by a user via a user interface (e.g., a user interface of the classical computing system 110).

In some examples, quantum computer input data 103 may include optional data pertaining to instructions that may be executed or used by a controller of the quantum computer 130 to control and manage certain operational aspects of the quantum computer 130. In some examples, the optional data included in the quantum computer input data 103 may comprise instructions usable by a compiler (e.g., a quantum compiler) that is executed by the controller of the quantum computer 130, for example, to mitigate errors, and managing qubit placement.

In some cases, the data source includes, for example, one or more of: a data memory with data stored therein, a sensor arrangement that is configured to stream sensor data, a user interface. In some embodiments, the data memory source may include an electronic memory configured to store computer-executable data. The data may include, data received from a user, another computing system (e.g., classical or quantum computing system), or a sensor. In some examples, the sensor arrangement includes sensors generating sensor data in real-time, satellite streamed data, camera surveillance systems, genomic data PCR readout machines, MRI 3-D imaging machines, encryption devices and so forth. Alternatively or additionally, the input data 101 may be provided from other sources, for example financial trading data, parameters of physical systems to be modelled, and so forth.

The quantum computer 130 is used by the classical computing system 110 to perform particularly computationally complex tasks that would take the classical computing system 110 an unacceptably long period of time to process. The quantum computer 130 may comprise one or more quantum circuits acting on qubits configured to perform certain computationally complex tasks using quantum effects. In various implementations, the quantum computer 130 may include one or more qubits (e.g., an array of qubits) and one or more quantum gates. In some cases, the quantum gates may comprise one or more rotation gates. In some cases, the quantum circuits may comprise at least a portion of the one or more qubits and one or more quantum gates.

In some implementations, the quantum computer 130 includes in a range of 30 to 1000 qubits, more optionally in a range of 50 to 500 qubits, and various gates that enable quantum parameters such as qubit phase to be modified (namely, rotation operations R) as well as and entanglement and superposition operations between qubits to be performed. In some examples, the quantum computer 130 is configured to perform quantum noise reduction to reduce quantum computational errors arising therein. Moreover, in certain configurations of the quantum computer 130, its qubits and quantum gates are cooled to cryogenic temperatures when in operation, for example to within 1 Kelvin of absolute zero temperature. Optionally, the quantum computer 130 is implemented using photonic devices, cryogenic superconducting gates or ion traps, or a combination thereof. Optionally, the classical computing system 110 is spatially remote from the quantum computer 130, and data exchange occurs therebetween via one or more data communication links, for example an Internet data link.

In some implementation, the quantum computing system 100 (also referred to as quantum computing system 10 in FIG. 2), may be configured to execute computer-executable instructions (e.g., program instructions) to process input data 101 to generate corresponding output data 102. The computer executable instructions may be executed by one or more electronic hardware processors of the quantum computing system 100. In some cases, the one or more electronic hardware processors can be electronic hardware processors of the classical computing system 110. In some cases, the one or more electronic hardware processors can be electronic hardware processors of the control system 20 of the quantum computing system 10 in FIG. 2.

In some cases, the program instructions can include a quantum amplitude estimation and/or amplification algorithms (e.g., maximum likelihood amplitude estimation algorithm), a variational approximation algorithm. In some cases, at least a portion of the quantum amplitude estimation and/or amplification algorithm and the variational approximation algorithm may be executed by the quantum computer 130 using one or more quantum circuits. In some examples, one or more quantum circuits of the quantum computing system may be configured based at least in part the input data 101. The quantum computer 130 may further process the outputs 104 received from the one or more quantum circuits to generate results usable for generating output data 102.

In some implementations, the quantum computer 130 may operate by processing a sequence of "shots". In some cases, initial states may be defined (Ansatz) and each shot may include, preparing qubits having the defined initial state and performing a temporal sequence of quantum operations on the qubits to generate processed qubits having final states. In some cases, the initial states may comprise zero states. In some cases, the quantum computer 130 may generate the processed qubits having the final states by altering the initial states. In some cases, the quantum computer 130 may readout the final state of the processed qubits using measurement operations (e.g., quantum measurement operations).

In some implementations, the quantum computer 130 may include one or more quantum circuits configured to process qubits. In some cases, a number of quantum operations performed by quantum circuit and/or the longest path in the quantum circuit may be referred to as "quantum circuit depth". In some cases, a path in the quantum circuit may comprise a sequence of quantum operations performed to transform the initial quantum states to the final quantum states.

Each shot may have a temporal duration that, in some cases, can be limited by quantum noise arising in the qubits, wherein the quantum noise can be manifest as qubit decoherence. In some examples, quantum noise arising in qubits increases as more quantum operations are performed on the qubits. As such, the quantum noise may increase with the corresponding quantum circuit depth. Despite such technological challenges, for certain types of computational tasks, the quantum computer 130 is extremely effective. Some of the methods disclosed herein may reduce the quantum circuit depth of the quantum circuits configured to generate outputs usable for computing a value of an arithmetic function based on values of one or more random variables associated with a probability distribution (e.g., a marginal distribution). Advantageously, these methods may reduce the quantum circuit depth without significantly increasing the computation time (e.g., a convergence time) and/or an error associated with the computed value.

In some cases, the configuration data 105 can be generated during execution of the aforesaid software instructions prior to run-time of quantum computer 130. In some examples, the configuration data 105 may include data usable for configuring one or more quantum circuits of the quantum computer 130 based at least in part on an arithmetic function. In some such cases, at least a portion of the software instructions may include a special compiler that upon execution generates the configuration data 105 by compiling another portion of instructions (e.g., configuration instructions), representing a configuration of the quantum computer 130. In some examples, the configuration data 105 may comprise data and/or instructions executable by the quantum computer 130 to configure the quantum circuits therein according to the configuration instructions.

For example, the TKET compiler, provided by Cambridge Quantum Computing Ltd., can convert a portion of the instructions into Hamiltonian functions that are subsequently processed during compilation to generate Pauli strings from which corresponding Pauli gadgets are derived, wherein the Pauli gadgets are then used to define configuration connections for quantum gates of the quantum computer 130, for example thereby creating a given quantum circuit. Such a process of converting Hamiltonian functions eventually to configuration connections for quantum gates is, for example, described in an IBM publication "*Circuit optimization of Hamiltonian simulation by simultaneous diagonalization of Pauli clusters*", Ewout van den Berg and Kristan Temme, IBM T.J. Watson, Yorktown Height, NY, USA, 31 Mar. 2020. The entire contents of this IBM publication are incorporated by reference herein and made a part of this specification. Moreover, a publication "*A compact ion-trap quantum computing demonstrator*", Pogorelov et al. describes a practical implementation of the quantum computer 130, the entire contents of this publication are incorporated by reference herein and made a part of this specification.

In some cases, a quantum compiler may convert a first quantum circuit or a symbolic form of a first quantum circuit to a second quantum circuit or a symbolic form of a second quantum circuit, wherein the second quantum circuit or the symbolic form of the second quantum circuit comprise 'native gates' for the target hardware. In implementations, the TKET compiler may reduce the corresponding quantum circuit depth (e.g., the quantum circuit depth of the second quantum circuit or its symbolic form). In some examples, the TKET compiler may reduce the quantum circuit depth by at least removing some manifest redundancies in the quantum circuit.

It will be appreciated that the aforesaid software instructions can relate to a plurality of types of computation that process data in manner to generate a technical effect, for example for implementing data encryption, data decryption, for filtering measurement data representative of measured physical parameters to reduce stochastic noise in the data, correlating measurement data to detect occurrence of a signal feature that is masked by stochastic noise and so forth. The quantum computing system 100 is thereby capable of providing a technical effect when processing data.

In some applications, computation may require an arithmetic function to be computed. In some cases, it is desirable that arithmetic computations are performed on the quantum computer 130 (e.g., to reduce the computation time). When reading out the aforesaid qubits, various methods can be used to reduce readout noise of the qubits; such methods include quantum amplitude estimation (QAE) requiring shots to be repeated to enable an average of output to be computed from which a best estimate of qubit value can be calculated. For achieving an optimal data processing throughput of the quantum computing system 100, it is often advantageous to reduce an amount of switching of tasks between the quantum computer 130 and the classical computing system 110.

Thus, from the foregoing, it will be appreciated that, in order to obtain a maximum performance from the quantum computing system 100, it is desirable that some of the aforesaid shots enable arithmetic computations to be performed on the quantum computer 130 in preference to using the classical computing system 110. In the present disclosure, there is provided an especially effective and efficient method of implementing such arithmetic computations using the quantum computer 130.

Detail Description of Embodiments

Figure 2:
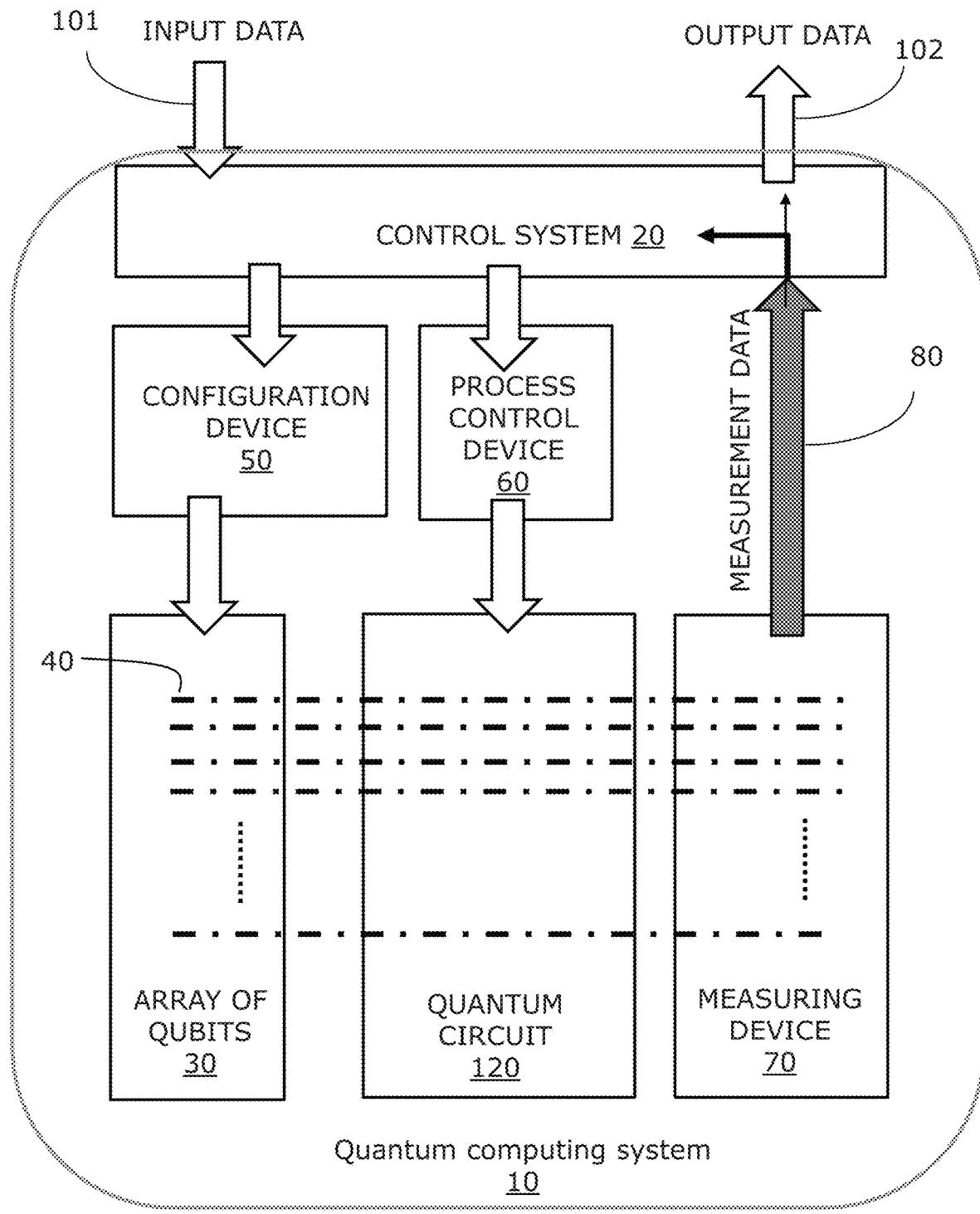
FIG. 2 is an illustration of a quantum computing system including an array of qubits.

In FIG. 2, there is shown an illustration of an example quantum computing system 10. The quantum computing system 10 may include a control system 20 that is coupled to an array of qubits 30, for example to a given qubit 40. The array of qubits 30 are implemented, for example, using ion traps, Josephson junctions, photonic circuits and so forth. The control system 20 can be coupled to a configuration device 50 that is configured to set initial states of the array of qubits 30. Moreover, the control system 20 is coupled to a control system process control device 60 that is configured to apply a sequence of quantum operations to the array of qubits 30. Furthermore, the control system 20 is coupled to a measuring device 70 that is configured to sense and measure quantum states of the array of qubits 30 after the sequence of quantum operations have been applied to the array of qubits 30. The measuring device 70 may generate measurement data 80 comprising the outcomes of quantum measurements performed on processed qubits. In some cases, the control system 20 may receive the measurement data and send control signals to the configuration device 50 and the process control device 60, for example, to configure the array of qubits 30 and a quantum circuit 120 for a next quantum processing step (e.g., a step of an iterative computational process). In some embodiments, the control system 20, the configuration device 50, and the process control device 60 are included in a classical computing system. In some embodiments, the quantum computing system 10 can be an example of the quantum computing system 100 where the control system 20, is included in the classical computing system 110 and the array of qubits 30, the quantum circuit 120, and the measuring device 70 are included in the quantum computer 130. In some such embodiments, the configuration device 50 and the process control device 60 may be included in the quantum computer 130 or the classical computing system 110.

In the quantum computing system 10, information is represented by the array of qubits 30. A characteristic of the given qubit 40 is that it is destroyed as a measurement of its state is made using the measuring device 70. The array of qubits 30 are thus represented by the smallest unit of information storage that is feasible in the quantum computing system 10, for example each qubit is represented by a single photon or a single ion. When data is represented by qubits of such small magnitude in the quantum computing system 10, the quantum computing system 10 (e.g., the array of qubits 30, the quantum circuit 120) becomes vulnerable to external sources of noise and interference, as well as sources of noise that are internal to the quantum computer system 10 (e.g. pulse cross-talk, ZZ crosstalk between qubits and so forth). In order to reduce such sources of noise from adversely affecting operation of the quantum computing system 10, it is contemporary practice to cool the array of qubits 30, the quantum circuit 120, and the measuring device 70, to temperatures approaching an absolute zero temperature, namely 0 Kelvin, namely −273.15° C. Such low temperatures reduce, for example, a magnitude of thermal noise sources within the quantum computing system 10. Noise artefacts in the array of qubits 30 can also arise when the quantum computing system 10 is in operation on account of residual signalling (namely, crosstalk) between qubits; such residual signalling can be a function of the sequence of quantum operations that is applied to the array of qubits 30.

The quantum computing system 10, when implemented in a contemporary manner as a noisy intermediate scale quantum computing system (NISQ computer), has in an order of 50 qubits, although larger quantum computing systems including 1000 qubits or more are envisaged to become available within the next 5 to 10 years. As aforementioned, the array of qubits 30 are then optionally implemented as ion traps, superconducting Josephson junction devices or similar. Each qubit is configured in operation to have a quantum state between |0> and |1>.

Next, a method for using the quantum computing system 10 to execute a quantum computation will be described in overview with reference to FIG. 3. In a first step of executing the quantum computation on the array of qubits 10, initial values are assigned to the qubits of the array of qubits 30. In some cases, the initial values may be extracted from the input data 101. In some embodiments, such initial assignment of values is achieved by using, for example, an Ansatz that is generated using a Hamiltonian via operation of the configuration device 50. In some cases, the Hamiltonian may be determined based at least in part on the input data 101, the data stored in a memory of the control unit 20, or data received from user via a user interface of the quantum computing system 10. In a second step, a sequence of operations is executed on the array of qubits 30, wherein the operations can include interactions such as C-NOT gates, Hadamard transforms, rotations, entanglements and so forth, wherein executions of the operations are shown in respect of a temporal abscissa axis 45 in FIG. 3, namely from left to right, and wherein the qubits are represented by horizontal lines from left to right in FIG. 3, for example a line 35. The operations are, for example, executed on the qubits temporally in parallel. In a third step, when the sequence of operations has been completed, values of the array of qubits 30 are then read (measured) during a measurement phase using the measuring device 70. The number of operations in the sequence is referred to a "depth" of a quantum circuit represented by FIG. 3, indicated generally by 120. As the depth of the of the quantum circuit 120 increases, there is risk of decoherence of the array of qubits 30 as well as errors occurring that are manifest as quantum noise. The quantum noise therefore determines a limit to a complexity of quantum algorithm (e.g., a number of quantum operation in a sequence of quantum operations of the quantum algorithm) that can be executed in the quantum computing system 10 on its array of qubits 30.

It will be appreciated that, in some cases, data representative of a given real physical system, for example sensor signals provided from a plurality of sensors coupled to the given real physical system to be monitored or characterized, can be processed to form to the aforesaid Ansatz to set initial states of the array of qubits 30, and the quantum circuit 120 can then be used to process the Ansatz to generate processed results representative of the given real physical system; the results are measured using the measuring device 70. The quantum circuit 120, for example, can be configured to perform special types of signal processing, for example to compute minimum energy states of the real physical system that provides insights, for example, into the stability of the real physical system, for example for safety purposes or optimal control purposes.

Some aspects of the present disclosure are concerned with measurements implemented at the measuring device 70. Whereas quantum errors accumulate in the array of qubits 30 as quantum operation are performed upon them, further noise can arise within the measuring device 70. At least part of the technical problem addressed by the disclosed systems and methods is to reduce a magnitude of the accumulated quantum errors and the further noise arising in the measuring device 70.

It will be appreciated that earlier methods involving techniques to reduce stochastic noise in sensed data representative of real physical systems have had patent rights granted in respect thereof; for example, reference is made to a granted United Kingdom patent GB2559437B, "Prenatal screening and diagnostic system and method", (Applicant: Congenica Ltd.), wherein PCR genetic readout data generated using known PCR genetic readout apparatus is subject to mathematical operations to reduce stochastic noise in the readout data. In the case of this granted patent, stochastic noise reduction in sensed data was regarded by the UKIPO as being a technical effect and acceptable for patentability pursuant to section 1(2) Patents Act 1977.

Figure 3:
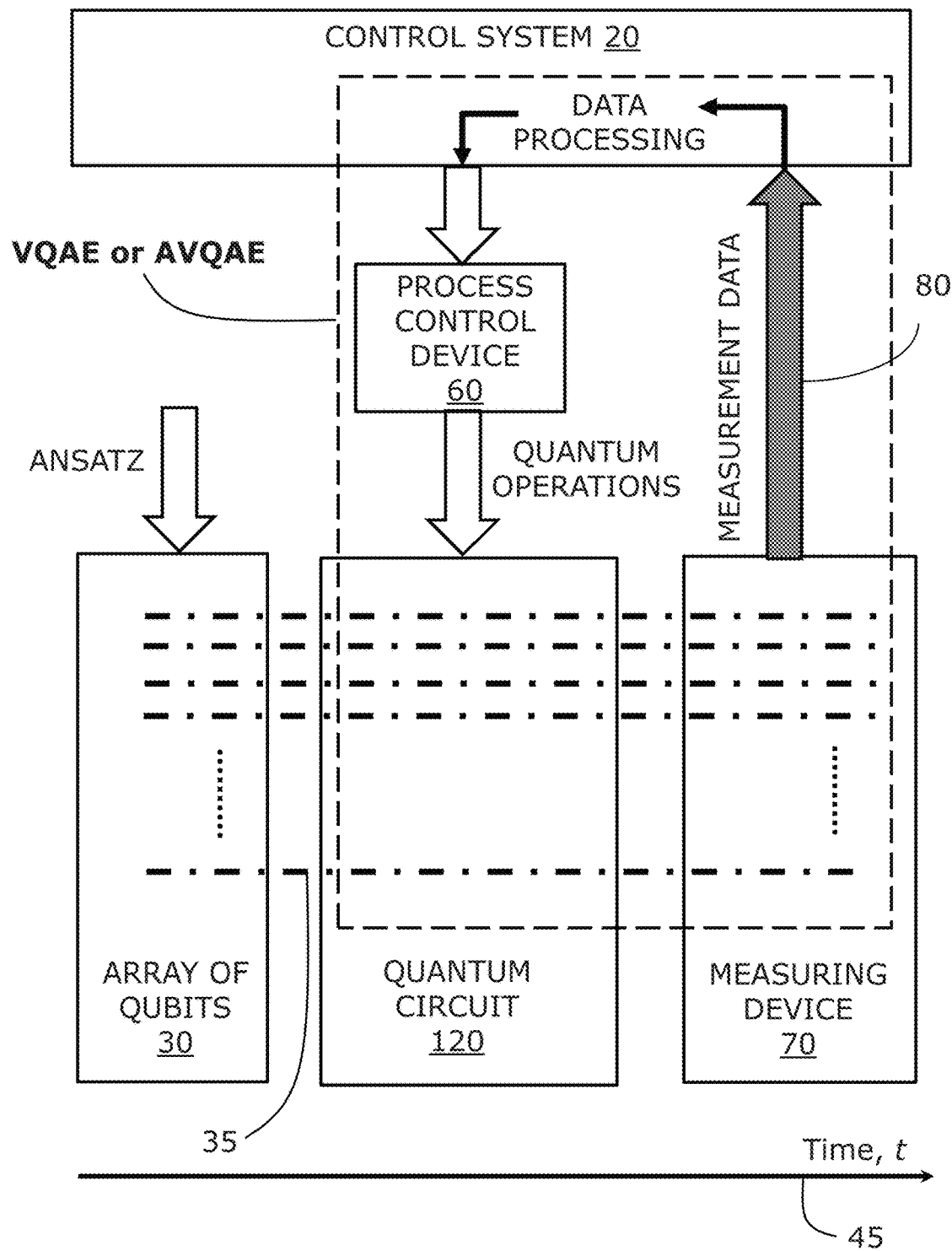
FIG. 3 is an illustration of the quantum computing system of FIG. 2 that is configured to execute a variational quantum amplitude estimation process.

In overview, referring to FIGS. 2 and 3, there is shown the quantum circuit 120 of the quantum computing system 10. The measuring device 70 is configured to measure states of the array of qubits 30 after the sequence of operations has been executed thereupon, for example by making single measurements, alternatively a plurality of measurements and then processing to try to reduce quantum noise in determinations of the states of the array of qubits 30.

In some embodiments of the present disclosure, the quantum noise generation during a quantum computational process may be controlled by reducing a maximum depth of the quantum circuits used for completing the quantum computational process to generate results having an error below a threshold error. In some examples, a series of quantum operations associated with the quantum computational process may be divided into a plurality of sequences of quantum operations, and the quantum state of the array of qubits 30 may be approximated (e.g., a variation method) after each sequence of the quantum operations. In some cases, where each sequence comprises a maximum likelihood amplitude estimation (MLAE) and the quantum state of the array of qubits is approximated using a variational approach, the corresponding quantum computational method may be referred to as Variational Quantum Amplitude Estimation (VQAE). In some examples, at least to sequence of the plurality of sequences of quantum operations may comprise the same number of quantum operations, or the same circuit depth. As such, in some cases, a circuit depth of the quantum circuit used for performing Variational Quantum Amplitude Estimation (VQAE) and generating results having an error below a threshold error, may be constant and independent of the threshold error. VQAE may enable performing certain quantum computational tasks on a NISQ computer.

It is contemporary known practice to use Monte Carlo (MC) estimation of the states of the array of qubits 30. In embodiments of the present disclosure, it is beneficial that the measuring device 70 in combination with the array of qubits 30 is implemented in a particular advantageous configuration, as will next be elucidated.

The measuring device 70 is beneficially configured to implement quantum amplitude estimation (QAE); in other words, with learning and by using fixed depth quantum circuit arrangements, it is feasible to implement quantum amplitude estimation (QAE) on a NISQ computer. In embodiments of the present disclosure, it is feasible to extend a speed-up of QAE to at least a further order of magnitude in precision of estimation values of the array of qubits 30 compared to other, non-variational approaches to determining the states of the array of qubits 30 after the aforesaid of quantum operations have been executed.

In embodiments of the present disclosure, exponential noise accumulation in the array of cubits 30 of the quantum computing system 10 is suppressed; in general, the exponential noise accumulation increases in magnitude as the depth of the quantum circuit 120 is increased. Embodiments of the present disclosure beneficially use fixed-depth quantum circuits that have a fixed depth, wherein the fixed-depth quantum circuits can be fine-tuned based on characteristics of quantum hardware of the quantum computing system 10. Thus, it is feasible to implement optimal hardware operations in the quantum computing system 10 that are susceptible to achieve a full theoretical speed-up when executing operations on the array of qubits 30; such a benefit of achieved by learning parameters of quantum gates that are applied to the array of qubits 30, despite sub-optimal quantum hardware control that may arise during operation of the control system 20.

In embodiments of the present disclosure, a level of quantum noise arising in quantum hardware of the quantum computing system 10 during a computational task (e.g., quantum amplitude estimation or amplification) may be reduced by using computational steps that allow performing the computational task while maintaining the depth of the corresponding quantum circuits constant. Moreover, in the embodiments, there is used a learning strategy that mitigates sub-optimal qubit control, wherein quantum noise otherwise grows exponentially as function of quantum circuit depth, wherein the quantum noise can potentially cause decoherence of the array of qubits 30, namely potentially a complete loss of quantum properties of the array of qubits 30. Furthermore, embodiments of the present disclosure improve sub-optimal control arising from operation of the control system 20 that would otherwise reduce a speed-up that is feasible based on theoretical noise limits.

It will be appreciated that, in embodiments of the present disclosure, input data 101 may comprise data generated by sensors that is representative of one or more real physical systems; for example, the input data 101 can be:
  (i) satellite data of captured images of the Earth's surface;
  (ii) aircraft movement data;
  (iii) projectile movement data when the quantum computing system 10 is included as part of a military defence system,
and so forth.

However, in embodiments of the present disclosure, it will be appreciated that the quantum computing system 10 is also susceptible to being used in use applications of a more abstract nature (that may be susceptible to patent protection in the USA pursuant to 35 USC 101), such as:
  (i) machine learning, for example for training generative models for simulating real physical systems;
  (ii) in finance, for performing risk estimation, for pricing portfolios, for performing value adjustments; and
  (iii) for performing quantum chemistry simulations, for example for estimating observables in quantum simulations.

Embodiments of the present disclosure, when applied to the hardware of the quantum computing system 10, beneficially use adaptive variational quantum amplitude estimation (AVQAE) that is a special case of variational quantum amplitude estimation (VQAE). Optionally, the AVQAE makes use of a rescaling algorithm, that potentially provides an order of magnitude reduction in the variation cost of the VQAE, e.g., by rescaling a real valued function whose expectation value has to be determined by the quantum amplitude estimation.

Moreover, embodiments of the present disclosure may reduce quantum noise associated with a quantum computational task (e.g., quantum amplitude estimation) most effectively when the quantum computing system 10 is implemented as an ion-trap quantum computing system, for example as manufactured by Honeywell, that benefits from a high connectively between qubits of the array of qubits 30. Furthermore, such an ion-trap quantum computing system allows deeper quantum circuits (e.g., quantum circuits associated with a sequence of VQAE) to be used before running an optimisation or approximation step; such a manner of use potentially enables the quantum noise reduction to be improved a further order of magnitude in comparison to the quantum computing system 10 implemented in a known contemporary manner However, embodiments of the present disclosure can be used with other type of quantum computing systems, for example superconducting Josephson junction quantum computing systems as manufactured by IBM Corp. USA.

Next, a further description for VQAE and AVQAE will be provided. Variational quantum amplitude estimation (VQAE) is a combination of two concepts: firstly, an original quantum amplitude estimation (QAE) algorithm and, secondly, a variational quantum algorithmic (VQA) method. The original QAE algorithm is susceptible to providing an advantage of a quadratic speedup over classical Monte Carlo (MC) sampling. However, this quantum algorithm has quantum hardware requirements that exceed capabilities of current NISQ computers. The VQA approach has established itself as a powerful set of tools to make the most of current quantum devices. In the present disclosure, an aim of synergistically combining QAE and VQA is to obtain a quantum algorithm for current NISQ computing technologies that achieves a quantum advantage over MC sampling.

To make the most of current NISQ computers, the noise arising when executing quantum calculations should be reduced. To this end, VQAE starts from the aforesaid original QAE algorithm and, firstly, replaces the deep and noisy quantum circuits used for the quantum Fourier transform by a classical inference procedure based on maximum likelihood estimation. Then, VQAE iterates the following two steps:

(1) a first step of applying a finite number of Grover iterations, during which the depth of the quantum circuit 120 and its associated noise grows, to estimate an amplitude of the noise; and
(2) a step of performing a variational optimization to reduce the circuit depth and noise of the quantum circuit 120.

The number of Grover iterations in the step (1) is chosen to be as large as possible according to a noise resilience of the available quantum hardware of the quantum computing system 10. Moreover, the step (2) replaces the deep and noisy circuit obtained after several Grover iterations by a more compact and less noisy circuit that represents a same quantum state of the circuit.

Adaptive VQAE (AVQAE) is a special, improved case of VQAE that has reduced computational requirements when executed on the quantum computing system 10. A naive VQAE implementation has a computational cost that exceeds a computation cost of a corresponding classical MC calculation. Such an increased computational cost arises due to the VQA part in VQAE; in other words, it is a cost of implementing the variational optimization. To reduce this cost, AVQAE adapts the problem and rescales the amplitude to be estimated. Then, variational optimization only needs to correct the current quantum state for a small deviation from the previous state. Such an approach can significantly reduce the computational cost, below the one of classical MC sampling, so that AVQAE can obtain a quantum advantage more easily than a naive VQAE realization.

After having completed the step (1) and (2) of VQAE or AVQAE, there is thereby obtained an empirical estimation of the expectation value that goes beyond what hardware noise allows standard QAE and with the same polynomial quantum advantage. The steps (1) and (2) can be repeated multiple times, namely in an iterative manner, for further refining the expected value estimation with quantum advantage. A more detailed description of operation of VQAE and AVQAE are described below.

Whereas quantum computing systems use Monte Carlo amplitude estimation when implementing the aforesaid measuring device 70 to determine states of the array of qubits 30 after executing of the quantum circuit 120 in the quantum computing system 10, the quantum computing system 10, when implemented pursuant to the present disclosure, implements a VQAE in the quantum circuit 120, wherein the VQAE is based on a maximum likelihood framework as proposed in reference with a linearly incremental sequence of iterations $\{m=1, 2, 3, \ldots, M\}$, wherein m is an integer representative of iteration number and M is a maximum number of iterations. Such a framework has an advantage that the depth of the quantum circuit 120 used for m-time application of applying a quantum operator (e.g., the Grover operator Q) increases linearly with an increase in the integer m. However, to prevent the circuit depth of the quantum circuit 120 increasing indefinitely, there is included, as an innovation, a variational step during which a quantum state resulted from M application of the quantum operator (e.g., $Q^M$) of a depth of the order k is approximated by a quantum state of a constant depth smaller than M. Beneficially, the variational approximation is performed every k-th power of Q where $0 < k < M$. For all other iterations, a corresponding power of Q (i.e., $Q^k$) may be applied to a variational quantum state (also referred to as variational state).

By configuring the quantum circuit 120 to implement VQAE therein to assist with determining states of the array of qubits 30 when measured using the measuring device 70, the state of the array of qubits 30 can be determined with less quantum noise. Often, the noise reduction can be an order of magnitude in comparison to Monte Carlo amplitude estimation.

In embodiments of the present disclosure, the quantum computing system 10 configured to implement VQAE can be further improved to reduce quantum noise arising therein by using adaptive variational quantum amplitude estimation (AVQAE); such AVQAE makes use of adaptive rescaling that is commonly used in Monte Carlo simulations [see reference 42], but has not hitherto been used for quantum noise reduction in the quantum computing system 10.

By using the AVQAE, it is feasible to configure the quantum circuit 120 in combination to using the measuring device 70 so that the sequence of quantum operations applied to the array of qubits 30 generates qubit output results from the measuring device 70 that are less noisy in respect of quantum noise in comparison to merely using known Monte Carlo amplitude estimation to implement the measuring device 70. By making the VQAE adaptive, up to an order of magnitude mitigation in quantum noise generated in the quantum computing system 10 can be feasible to comparison merely to using VQAE. VQAE is capable of providing up to an order of magnitude reduction in quantum noise relative to using known Monte Carlo amplitude estimation.

Figure 7:
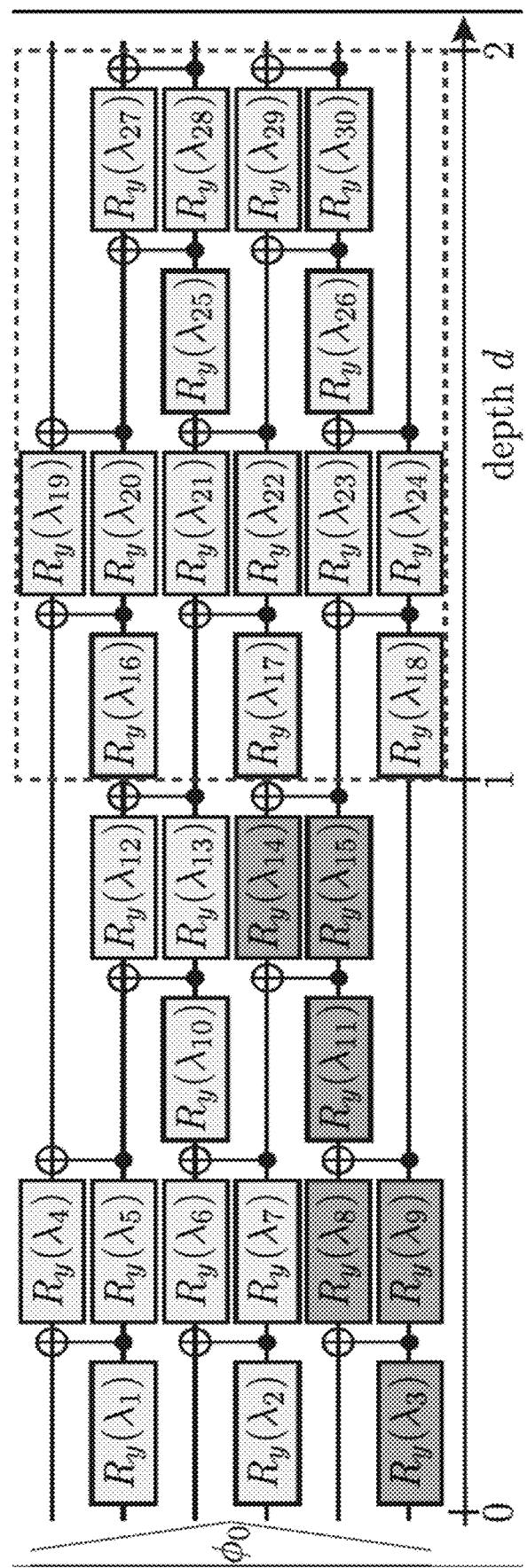
FIG. 7 is an illustration of a parametrized quantum circuit (PQC) ansatz of depth d for 6 qubits.

An implementation of a VQAE quantum circuit implementation of the quantum circuit 120 is illustrated in FIG. 7, for example in relation to suitable establishment of the Ansatz for the circuit 120. The quantum circuit in FIG. 7 includes a configuration of rotation operators denoted by "R", and C-NOT gates denoted by circles with "⊕" symbols.

Figure 4A:
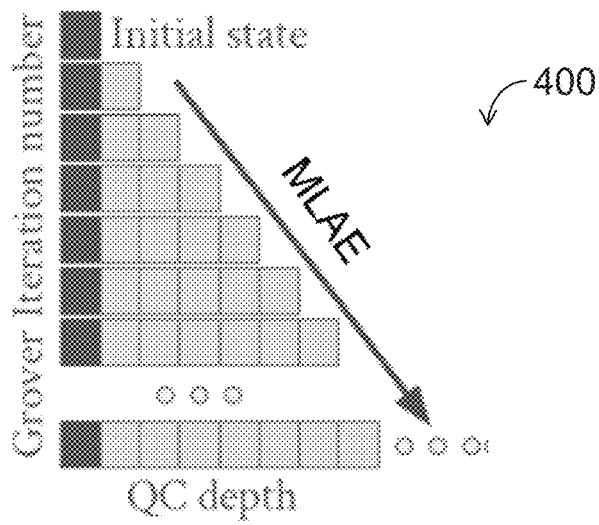
FIG. 4A is a diagram illustrating a maximum likelihood amplitude estimation process (MLAE).

FIG. 4A is a diagram providing an illustration of an amplitude estimation process 400 based on maximum likelihood amplitude estimation process (MLAE). In some cases, a series of squares in a row may represent a quantum state of one or more qubits (e.g., the quantum state of the array of qubits 30). The red (or darker) square may represent an initial quantum state (e.g., associated with an Ansatz), and the states that include the red (or darker) square and several grey (or lighter) squares may represent the quantum states of processed qubits, where a quantum state may be a result of a quantum operation (e.g., an operation comprising application of one or more Grover operators or Qs) on a previous state. The number of grey (lighter) squares in a state represent a number a quantum operation performed on the initial state to generate the corresponding state. Each step of the amplitude estimation process 400 may comprise performing a quantum operation on a previous state according to MLAE resulting in a linear incremental sequence of iterations as described above.

Figure 4B:
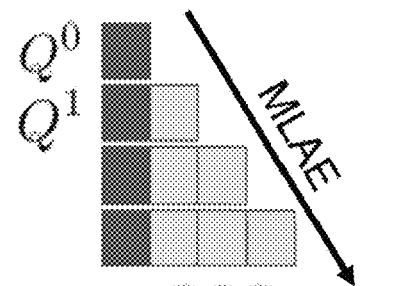
FIG. 4B is a diagram illustrating a variational quantum amplitude estimation (VQAE) process.
Figure 4B:
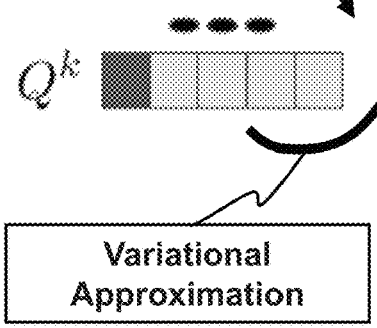
Figure 4B:
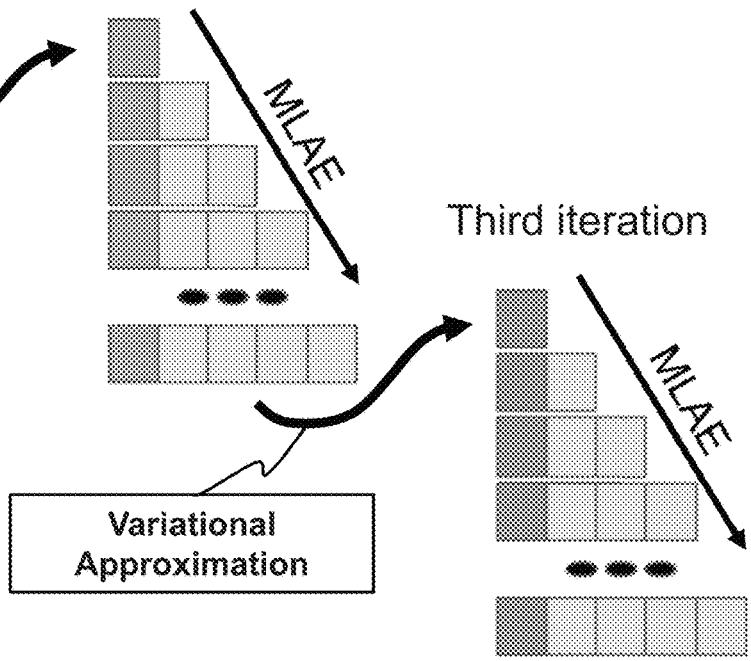

FIG. 4B is a diagram providing an illustration of a variational quantum amplitude estimation (VQAE) process 410. In some embodiments, the VQAE process 410 may comprise two or more iterations where each iteration comprises a sequence of quantum operations according likelihood amplitude estimation process (MLAE) algorithm. In some embodiments, an iteration of the VQAE process 410 may comprise the amplitude estimation process 400 comprising k quantum operations. In some embodiments, after each iteration of the VQAE process 410, the resulting state may be approximated using a variational approximation process to generate a variational quantum state (also referred to as a variational state) for the next iteration. In some embodiments, a number of the quantum operations performed in different iterations can be equal. In the examples VQAE process 410 shown in FIG. 4B, each iteration comprises four applications of the quantum operation (e.g., a quantum operation comprising the Grover operator). In some embodiments, a depth of the quantum circuits used in different iterations can be equal and may not exceed a maximum depth. The iterations of the VQAE process 410 may be repeated until the corresponding quantum amplitude is estimated with an error below a threshold error. Advantageously, increasing the number of iterations in the VQAE process 410 may not increase the maximum depth of the quantum circuits used in the process.

In some implementations, the (VQAE) may be implemented to perform a computational task (e.g., quantum computational task). In some cases, the computational task may comprise calculating the expectation value of a real-valued function f(x):

$$\mathbb{E}_p[f] = \sum_x p(x)f(x) \quad (1)$$

where p(x) represents probability distribution. In some cases, the solution to Eq. 1 may be encoded on the quantum computing system 100, 10 using a qubit array and a quantum circuit (e.g., the array of qubits 60 and quantum circuit 120).

In some embodiments, to reduce a variational cost of the VQAE process 410, the function f may be rescaled such that k-th power of the Grover operators close to the identity and then the variational approximation is carried out. As described above, such modified VQAE process may be referred to as adaptive VQAE or AVQAE. In examples, the rescaling process may be performed classically by the classical computing system 110 or the control system 20.

Figure 5:
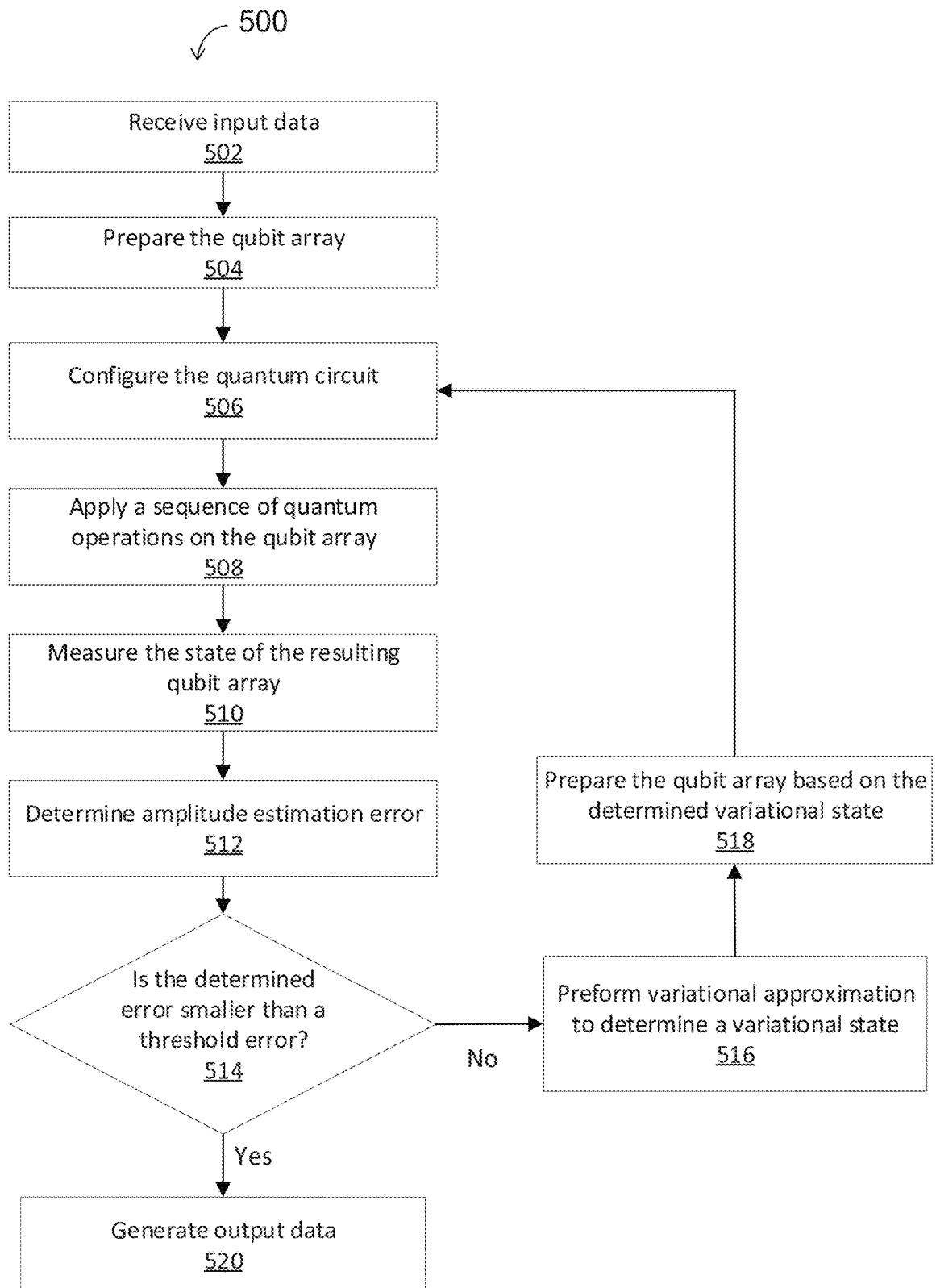
FIG. 5 is a flow diagram illustrating an example method that may be used by the quantum computing system to determine the expectation value of an arithmetic function.

FIG. 5 is a flow diagram providing an illustration of an example process 500 that may be used by a quantum computing system (e.g., quantum computing system 100, 10) to determine the expectation value of the function f(x) (e.g., the expectation value defined above). In some cases, the quantum computing system may determine the expectation value of the function f(x) using variational quantum amplitude estimation (VQAE) or adaptive variational quantum amplitude estimation (AVQAE). In some cases, the process 500 may be performed by a hardware processor of the quantum computing system (e.g., the hardware processor of the classical computer 110), and/or a control system (e.g., the control system 20) of the quantum computing system 10, 100.

The process 500 begins at a block 502 where the quantum computing system receives input data from a data source. In some cases, the data source can be a user interface of the quantum computing system (e.g., a user interface of the classical computer). In some such cases, data source may comprise a sensor or a sensor network, and the input data may be representative of sensed data from a physical system, and the output data is representative of a state or a characteristic of the physical system. In some cases, the data source may include a memory (e.g., a non-transitory memory of a computing system separate from the quantum computing system), or a sensor arrangement that is configured to generate and stream sensor data. In some examples, the data source can be a user providing input data via user interface of the quantum computing system or a user interface in communication (e.g., via wired or wireless data link) with the quantum computing system. In some examples, the input data may be stored in a memory of the quantum computing system. In some cases, input data may be usable by the quantum computing system for generating an expectation value of the function f(x) using VQAE or AVQAE. In some cases, input data may comprise at least a real valued function and a probability distribution. Additionally, the input data may comprise a parameter used by a quantum algorithm to perform a quantum computational task. In some cases, the parameter may comprise a number of quantum operations in a sequence of quantum operations or an iteration of the VQAE or AVQAE. In some cases, the parameter may comprise a threshold error (amplitude estimation error) associated with a result of the quantum computation task.

At a block 504, the quantum computing system may prepare an initial quantum state of the qubits (e.g., the array of qubits 30). In some examples, computing system may prepare the initial quantum state of the qubits based at least in part computing system may prepare an initial quantum state of the qubits (e.g., the array of qubits 30) of the input data 101. A state of the quit array or bit string may comprise a quantum state expressed in a computational bases of the corresponding bit string.

At a block 506 the quantum computing system may configure one or quantum circuits (e.g., the quantum circuits 120) for performing a first iteration of the VQAE, for example, based on MLAE.

In some embodiments, blocks 504 and 506 may comprise encoding a solution to Eq. 1 on a quantum computer, e.g., the quantum computer 130 or the quantum computer comprising the array of qubits 30, the quantum circuit 120, and the measuring device 70. In some cases, the quantum circuit may comprise the Grover operator Q.

At a block 508, the quantum computing system may apply a sequence of quantum operations on the array of the qubits. In some cases, applying a sequence of quantum operations on the array of the qubits may comprise a MLAE process. In some cases, the quantum computing system may determine a number of quantum operations in the sequence of the quantum operations based at least in part on the input data 101.

At a block 510, the quantum computing system may measure the state of the qubits and generate measurement data 80, using the measuring device 70. A classical computing system (e.g., the classical computing system 110) or a control system (e.g., the control system 20) may receive and analyse the measurement data 80. In some cases, the measurement data 80 may comprise measured state of processed qubits. In some cases, the processed qubits may comprise final processed qubits.

At a block 512, the quantum computing system may determine an amplitude estimation error based on the analysis performed at the block 510.

At a decision block 514, the quantum computing system may determine whether the determined error is smaller than a threshold error. In some embodiments, the threshold error may be a value included in the input data 101.

If at the block 514 the computation system determines that the determined error is smaller than the threshold error, the process may proceed to a block 520 where the quantum computing system generates output data based on the final processed qubits. In some embodiments, the output data may comprise an estimated amplitude having an amplitude estimation error smaller than the threshold error. In some cases, when the computing system may generate output data, the corresponding computing task (e.g., quantum amplitude estimation) is complete. In some cases, a computational cost of a computational task may comprise a number of queries used to make the amplitude estimation error smaller than the threshold value.

If at the block 514 the computation system determines that the determined error is greater than the threshold error, the process may proceed to a block 516 where the quantum computing system performs a variation approximation to determine a variational state associated with the state of the processed qubits resulting from the previous sequence of the quantum operations performed at the block 508. In some cases, the quantum computing system may determine the variational state using a combination of classical and quantum computation steps performed using the classical computing system 110 and the quantum computer 130, respectively. In some cases, the quantum computing system may determine a quantum state of the qubit array based at least a portion of the measurement data 80 and determine the variational state by variationally approximating the determined quantum state using a quantum circuit. The variational state comprises a parametrized quantum circuit (PQC) determined using a PQC ansatz.

In some cases, at the block 516, the quantum computing system may configure one or more quantum circuits and perform the variational approximation using the one or more quantum circuits. In some examples, the variational approximation may comprise a gradient based approximation using Adam optimizer.

At block 518, the quantum computation system prepares the array of qubits based on the determined variation state and process proceeds to the block 506 where the quantum computation system configures quantum circuits to perform a next iteration (e.g., the second iteration) of the VQAE process. In some cases, the iteration may comprise a sequence of quantum operations (e.g., the same quantum operations), having the same number of quantum operations and/or the same circuit depth as the previous iteration (e.g., the first iteration).

In some cases, the process 500 may skip the block 514 and proceed to the block 516 and repeat the iterative process after a set number of iterations are performed. In some such cases, once the last iteration is performed, the process 500 may proceed to a block 520. In some cases, the set number of iterations may be included in the input data 101.

In some implementations, the circuit depth of a quantum circuit used for amplitude estimation using the process 500 may be controlled using the variational approximation step. For example, if estimating the quantum amplitude with an error below a target error can be achieved by M times application a query operator (e.g., the Grover operator), the corresponding circuit depth may be kept constant by performing a variational approximation of the resulting state after k sequential application of the query operator (where 0<k<M), to generate a variational state. Next, the resulting variational state may be used as the initial state for applying the next sequence of operators (e.g., k sequential application of the query operator). This process may be repeated in iterative manner until the query operator is applied M time and/or the amplitude estimation error becomes smaller than the target value.

In VQAE, the total number of queries is composed of two separate contributions, namely a first consideration and a second consideration. The first consideration accounts for the sampling of the quantum circuits and the second contribution corresponds to the variational approximation cost. In some cases, the number of queries used per variational approximation is independent of the number of iterations changes only as a function of the desired variational error as well as the depth of the circuit for an objective function. The variational approximation step significantly affects the total number of queries $N_q$ used by VQAE. In some embodiments, when the VQAE process 500 is used, a maximum circuit depth of the quantum circuit for performing the quantum computational task is independent of the number of quantum operations in the series of the quantum operations.

As described above, in some embodiments, to reduce the variational cost of VQAE an adaptive VQAE (AVQAE) algorithm may be implemented. This algorithm makes use of adaptive rescaling of the function f, based on importance sampling by scaling, which is well known in statistics and commonly used in Monte Carlo simulations [42]. In some embodies, AVQAE may comprise a rescaling step before the block 504 or the block 518. In some embodiments, the rescaling step may be performed by the classical computing system 110 or the control system 20.

In some embodiments, a quantum computing system that uses adaptive VQAE for quantum amplitude estimation may complete a computational task and generate the output data with a smaller number of queries compared to a computing system (e.g., classical computing system) that uses classical Monte Carlo method. In some examples, the number of queries used to generate output data using adaptive VQAE can 2 times, 4 times, 6 times, 8 times, 10 times, 20 times, 50 times, 100 times smaller than the number of queries used to generate output data using classical Monte Carlo method.

Example Implementation of VQAE and AVQAE

Below we numerically show that in the context of Monte Carlo integration, shallow circuits can accurately approximate many amplitude amplification steps. We combine the variational approach with maximum likelihood amplitude in the context of Monte Carlo integration, estimation [Y. Suzuki et al., Quantum Inf. Process. 19, 75 (2020)] in variational quantum amplitude estimation (VQAE). VQAE can exhibit a cubic quantum speedup over classical Monte Carlo (MC) sampling if the variational cost is ignored. If this cost is taken into account, VQAE typically has larger computational requirements than classical MC sampling. To reduce the variational cost, we propose adaptive VQAE and numerically show that it can outperform classical MC sampling.

Amplitude estimation [1] is a powerful algorithm that can achieve a quadratic quantum speedup over classical Monte Carlo (MC) methods [2]. It has a wide range of applications, e.g., in quantum chemistry [3, 4], machine learning [5-7], and finance [8-10] where it can help with tasks such as risk analysis [11, 12] and the pricing of financial derivatives [13, 14]. The original amplitude estimation procedure [1] has hardware requirements that are challenging for current quantum devices and, therefore, reducing these requirements is currently an active area of research. Important breakthroughs were obtained in recent proposals which succeeded in replacing the hardware-intensive components of traditional amplitude estimation—controlled multi-qubit gates and quantum Fourier transform—by classical post-processing [15-18]. Alternatively, one can systematically reduce the circuit depth by interpolating between classical MC methods and amplitude estimation [19]. Additionally, classical preprocessing can replace costly quantum arithmetic [20].

Here, in the present disclosure, there is addressed the question whether the quantum computational requirements for amplitude estimation can be further decreased by making use of variational quantum algorithms [21-23]. Moreover, in the following, there is presented variational quantum amplitude estimation (VQAE) in which the depth of the entire quantum circuit is kept below a desired maximum value by means of variational optimization. VQAE is based on maximum likelihood amplitude estimation (MLAE) [15]. Moreover, there is also presented a naïve and an adaptive VQAE algorithm. Adaptive VQAE rescales the amplitude to reduce the cost of the variational optimization. The advantage of VQAE over MLAE is that the maximum circuit depth of VQAE is independent of the total number of MLAE steps, whereas in MLAE this depth grows linearly with the number of MLAE steps. The advantage of VQAE over classical MC sampling is that VQAE can have a lower computational cost.

Figure 6:
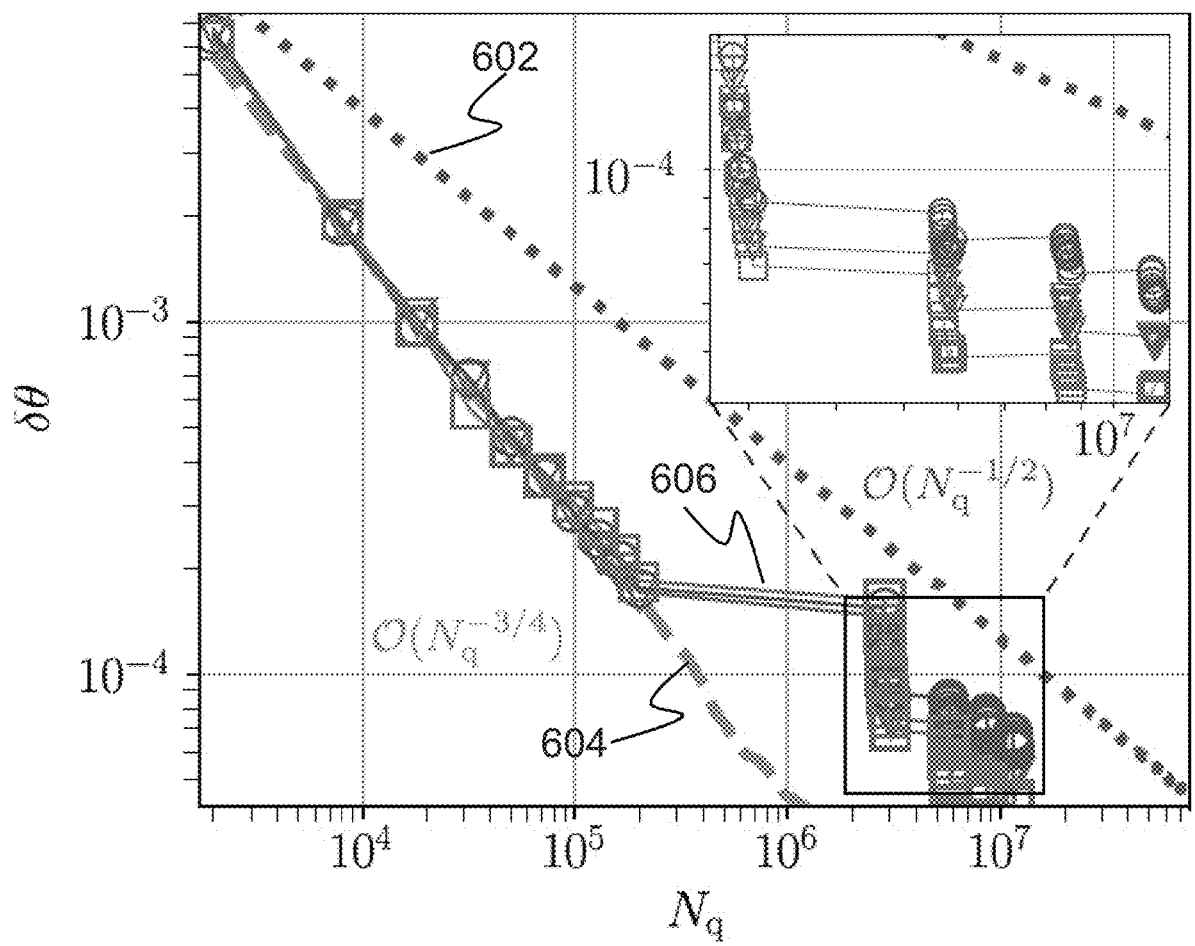
FIG. 6 is a graph in which amplitude estimation error is plotted against the number of queries for VQAE (symbols with lines guide to the eye), MLAE (dashed orange) and classical MC sampling (dotted blue). Amplitude estimation errors are calculated based on the rescaled mean value of a shifted Lorentzian (red circles), Gaussian (green triangles), and log-normal (purple squares) probability distribution.

In FIG. 6, there is shown an amplitude estimation error $\delta\theta$ as a function of the computational cost, i.e., the number of queries $N_q$. It is beneficial to compare adaptive VQAE (symbols with lines guide to the eye) to MLAE (dashed orange) 604 and classical MC sampling (dotted blue) 602. There is calculated the rescaled mean value of a shifted Lorentzian (red circles), Gaussian (green triangles), and log-normal (purple squares) probability distribution. In VQAE, the first ten (10) amplitude estimates are computed via MLAE, then one step of the variational optimization 606 is performed, which is followed by the next iteration of ten (10) MLAE steps. This procedure of variational approximation followed by MLAE is repeated three more times, resulting in a final error $\delta\theta \approx 6 \cdot 10^{-5}$. It will be appreciated that, for this error, $N_q$ is up to an order of magnitude smaller in VQAE than in classical MC sampling. Throughout this calculation, VQAE's circuit depth may not exceed the depth of the initial state plus ten (10) times the depth of the query operator, whereas MLAE's circuits have the depth of the initial state plus, at the end, fifty (50) times the depth of the query operator. In FIG. 6, there is shown that, for the problems considered here, VQAE outperforms classical MC sampling and additionally keeps the overall circuit depth below a fixed value.

In Section I, there are defined the problems considered here and explain the original quantum algorithm for amplitude estimation as well as the classical MC approach. Then, in Section II, there are presented, pursuant to the present disclosure, variational methods, there are studied variational errors of constant-depth quantum circuits, and there are developed naïve and adaptive VQAE. A conclusion and discussion of potential next steps is provided in Section III.

Section I

I-A. Problem Definition

In this section, there is firstly defined the problem that is of interest. Next, there is explained quantum amplitude estimation and classical MC sampling. There is focus on the calculation of expectation values $$\mathbb{E}_p[f] = \sum_x p(x) f(x) \tag{1}$$

where the sum runs over $2^n$ equidistant values of $x \in [0,1)$, $p(x)$ represents a probability distribution and $f(x)$ a real-valued function. Here, n is the qubit count of the wave function that encodes $p(x)$ and $f(x)$ in its amplitudes. We consider three probability distributions: a Gaussian $$p_G(x) = \frac{1}{\mathcal{N}_G} \exp\left(-\frac{(x-\mu)^2}{2\sigma^2}\right), \tag{2}$$

A Cauchy-Lorentz $$p_{C-L}(x) = \frac{1}{\mathcal{N}_{C-L}} \frac{\sigma}{(x-\mu)^2 + \sigma^2}, \tag{3}$$

and a log-normal distribution $$p_{l-n}(x) = \frac{1}{\mathcal{N}_{l-n}(c_0 + c_1 x)} \exp\left(-\frac{(\ln(c_0 + c_1 x) - \mu)^2}{2\sigma^2}\right). \tag{4}$$

The normalization constants $\mathcal{N}_G$, $\mathcal{N}_{C-L}$ and $\mathcal{N}_{l-n}$ are chosen so that $\Sigma_x p(x)=1$. There are chosen the following parameters for the analysis. There is fixed the total number of qubits encoding $f(x)$ and $p(x)$ to n=5. In the calculations with the Gaussian and Cauchy-Lorentz distribution, there is used $\mu=0.5$ and $\sigma=0.1$. In the calculations with the log-normal distribution, there is used $c_0=0$, $c_1=10$, $\mu=1.5$, and $\sigma=0.2$. For the function $f(x)$, there is used $$f(x) = Cx \tag{5}$$

with some C>0. For this choice of parameters, the expectation value (1) is approximately $\mathbb{E}_p[f] \approx 0.5$ C for all chosen distributions.

1-B. Quantum Amplitude Estimation

Next, there is presented a way to encode the solution to (1) on a quantum computer. There are assumed $f(x)$ and $p(x)$ that are functions that map $[0,1)$ to $[0,1]$. There are considered real numbers $x \in [0,1)$ that satisfy $$x = \sum_i \frac{x_i}{2^{n-i}}, x_i \in \{0, 1\} \tag{6}$$

and that identify with n-bit strings $\{x_i, i=1, 2, \ldots, n\}$. Each bit string shall correspond to a quantum state $|x\rangle = |x_1, x_2, \ldots, x_n\rangle$ in the computational basis of an n-qubit register. Additionally, there is a quantum circuit $\mathcal{A}$ that acts on a register of n+1 qubits and produces a state $|X0\rangle_{n+1} = \mathcal{A}|0\rangle_{n+1}$ such that $$|X0\rangle_{n+1} = \sqrt{1-a}|\psi_{bad}\rangle_n|0\rangle + \sqrt{a}|\psi_{good}\rangle_n|1\rangle. \tag{7}$$

Here $|\psi_{bad}\rangle_n$ and $|\psi_{good}\rangle_n$ are two normalized quantum states of a n-qubit register which is connected to one additional ancilla qubit. There is defined the good state $$|\psi_{good}\rangle_n = \frac{1}{\sqrt{a}} \sum_x \sqrt{p(x)f(x)}|x\rangle_n \tag{8}$$

so that $a = \mathbb{E}_p[f]$ of Eq. (1) coincides with the probability of measuring the ancilla qubit in the state $|1\rangle$.

To determine a, the amplitude estimation algorithm uses the Grover operator $Q = -\mathcal{R}_x \mathcal{R}_{good}$ [1, 24, 25] where $$\mathcal{R}_x = \mathbb{1} - 2|X0\rangle_{n+1}\langle X0|_{n+1} = \mathbb{1} - 2\mathcal{A}|0\rangle_{n+1}\langle 0|_{n+1}\mathcal{A}^\dagger$$
$$\mathcal{R}_{good} = \mathbb{1} - 2|\psi_{good}\rangle_n|1\rangle\langle\psi_{good}|_2\langle 1|$$ (9)

are reflections in a two-dimensional subspace $\mathcal{H}_x$ spanned by states $|\psi_{bad}\rangle_n|0\rangle$ and $|\psi_{good}\rangle_n|1\rangle$. We define $a=\sin^2(\theta)$ and explicitly write out the action of Q:

$$|Xm\rangle_{n+1} = Q^m|X0\rangle_{n+1} = \cos[(2m+1)\theta]|\psi_{bad}\rangle_n|0\rangle + \sin[(2m+1)\theta]|\psi_{good}\rangle_n|1\rangle.$$ (10)

Therefore, the subspace $\mathcal{H}_x$ is stable under the action of $Q$ and the only effect of $Q$ is to rotate by an angle of $2\theta$. The original amplitude estimation algorithm then uses quantum phase estimation to find the eigenvalues of $Q$ equal to $\exp(\pm 2i\theta)$ and provides an estimate of a with an error $$\epsilon \leq 2\pi \frac{\sqrt{a(1-a)}}{N_q} + \frac{\pi^2}{N_q^2},$$ (11)

with a probability of at least $8/\pi^2$ [1].

Traditional amplitude estimation has high requirements on quantum hardware because it uses quantum phase estimation. This algorithm uses the quantum Fourier transform and multiple controlled $Q^m$ operations where $\{m=1, 2, 4, \ldots, 2^M\}$. The depth of the corresponding quantum circuit is mostly determined by the depth of the last controlled $Q^m$ operator for which $m=2^M$. In general, the total circuit depth scales like the total number of queries $\mathcal{O}(N_q) \sim \mathcal{O}(1/\epsilon)$ inversely proportional to the desired error $\epsilon$.

To avoid these deep quantum circuits, several recent articles propose new ways to carry out amplitude estimation circumventing quantum phase estimation [15, 17, 18] and circuits of depth $\mathcal{O}(1/\epsilon)$ [19]. One proposal is MLAE [15] in which one combines measurements of the states $|Xm\rangle_{n+1}$ with a maximum likelihood estimation of a. For an exponential schedule $\{m=1, 2, 4, \ldots, 2^M\}$, this algorithm has the query cost $N_q \sim \mathcal{O}(1/\epsilon)$. A linear schedule $\{m=1, 2, 4, \ldots, M\}$, increases the query cost to $N_q \sim \mathcal{O}(\epsilon^{-4/3})$. Note that in this case $N_q$ scales quadratically with the maximum circuit depth M. Following the same idea of reducing the hardware requirements, the authors of Ref. [19] present two algorithms with computational cost $N_q \sim \mathcal{O}(1/\epsilon^{\beta+1})$ for quantum circuits of reduced depth $\mathcal{O}(1/\epsilon^{1-\beta})$. These algorithms are controlled by an external parameter $\beta$ which allows one to interpolate between the quantum regime at $\beta=0$ and the classical MC regime at $\beta=1$.

I-C. Classical MC Sampling

There is performed classical MC sampling in the following way. There is sampled from the state $|X0\rangle_{n+1}$ of Eq. (7) and the ancilla qubit is measured. There is then computed a as the relative frequency of measuring the ancilla qubit in the state $|1\rangle$. This calculation of a has the error $\epsilon = \sqrt{a(1-a)/N_q}$ so that the total number of queries required for a certain error $\epsilon$ is $N_q \sim \mathcal{O}(1/\epsilon^2)$ [26].

Comparing this query cost with the previous ones, it is found that traditional amplitude estimation as well as MLAE with exponential schedule achieve a quadratic quantum speedup over classical MC sampling. Both MLAE with linear schedule and the algorithms in [19] obtain a reduced quantum speedup.

Note that, the query complexity is defined in terms of $\mathcal{A}$ operators, with two applications of $\mathcal{A}$ required per application of $Q$, see Eq. (9). Also, the depth of quantum circuits is measured in units of $\mathcal{A}$.

II. Variational Algorithms

Here, there is presented variational algorithms pursuant to the present disclosure. There is firstly explained the general VQAE formalism, then a naïve implementation pursuant to the present disclosure, and finally the adaptive VQAE approach pursuant to the present disclosure.

Section II-A. General Formalism

The VQAE algorithm is based on the maximum likelihood framework of Ref. [15] with linearly incremental sequence $\{m=1, 2, 3, \ldots, M\}$. In this framework, the depth of the quantum circuit implementing the state $|Xm\rangle_{n+1} = Q^m|X0\rangle_{n+1}$ increases linearly with m. To prevent the circuit depth from increasing indefinitely, there is added to this framework a variational step during which the quantum state $|Xm\rangle_{n+1}$ of depth $\mathcal{O}(m)$ is approximated by a quantum state of a constant depth $\mathcal{O}(1)$. The variational approximation is performed every k-th power of $Q$, with $0<k<M$. For all the other iterations, there is simply applied the corresponding power of $Q$ to the variational state. This results in Algorithm 1 presented below.

---
Algorithm 1 Variational quantum amplitude estimation
---

Require: $|\phi_{i=0}\rangle_{n+1} = |X0\rangle_{n+1}, Q$
  for $0 \leq i \leq \lfloor M/k \rfloor$ do
    for $0 \leq j < k$ do
      Sample the circuit $Q^j|\phi_i\rangle_{n+1}$ and collect h samples.
      Save the number of times the ancilla qubit is $|1\rangle$ in a variable $h_m$,
      with $m = i \cdot k + j$
    end for
    if $i \neq \lfloor M/k \rfloor$ then
      Perform the variational approximation
        $|\phi_{i+1}\rangle_{n+1} \approx Q^k|\phi_i\rangle_{n+1}$
    end if
  end for
Use $\{h_m\}$ to carry out the maximum likelihood estimation The maximum likelihood post-processing [15] consists in maximizing the likelihood function $L(\{h_m\}, x) = \Pi_m L_m(h_m, x)$ with $$L_m(h_m, x) = [\sin^2((2m+1)x)]^{h_m}[\cos^2((2m+1)x)]^{h-h_m},$$ (12)

so that the estimate of the phase $\theta$ becomes $$\hat{\theta} = \arg\max_x(\ln L(\{h_m\}, x))$$ (13)

In embodiments of the present disclosure, implementations of the maximum likelihood estimation use $h=2\times 10^3$ samples. The minimization of $L(\{h_m\}, x)$ is accomplished by means of a brute-force search algorithm that uses $5\times 10^3$ grid points.

In embodiments of the present disclosure, the states $Q^k|\phi_i\rangle_{n+1}$ are variationally approximate by minimizing $\||\phi_{var}(\lambda)\rangle_{n+1} - Q^k|\phi_i\rangle_{n+1}\|^2$ which is equivalent to maximizing the objective function $$\mathcal{F}(\lambda) = \mathfrak{Re}(\langle\phi_{var}(\lambda)|_{n+1} Q^k|\phi_i\rangle_{n+1})$$ (14)

with respect to the variational parameters λ. The depth of the quantum circuit for $\mathcal{F}(\lambda)$ is 2k+2. In general, the variational quantum state $|\phi_{var}(\lambda)\rangle_{n+1}$ is a parameterized quantum circuit (PQC)

$$|\phi_{var}(\lambda)\rangle_{n+1} = \mathcal{U}_{var}(\lambda)|\phi_{init}\rangle_{n+1} = \prod_j e^{-i\lambda_j G_j}|\phi_{init}\rangle_{n+1} \quad (15)$$

where $G_j$ are Hermitian operators acting on the (n+1)–qubit register and $|\phi_{init}\rangle_{n+1}$ is some initial state. For purposes of the present disclosure, there is interest in hardware-efficient quantum circuits that produce real-valued quantum states.

In FIG. 7, there is shown a variational PQC ansatz of depth d for 6 qubits. The variational parameters $\lambda_j$ are in single-qubit rotation gates $R_\mathcal{Y}(\lambda_j)=\exp(-i\lambda_j \sigma_\mathcal{Y}/2)$ where $\sigma_\mathcal{Y}$ denotes the $\mathcal{Y}$ Pauli matrix. In naïve VQAE, $|\phi_0\rangle_{n+1} = |0\rangle_{n+1}$ and the circuit structure inside the dashed box is repeated d times. In adaptive VQAE, $|\phi_0\rangle_{n+1}=|X0\rangle_{n+1}$ and only the dark blue gates with adjacent CNOTs form our variational ansatz. There is used the PQC shown in FIG. 7 that is composed of d layers with 15 parameterized single-qubit rotation gates and 10 CNOT gates per layer.

One single variational update of a PQC consists of $n_s$ sweeps over all circuit parameters, during which all parameters are updated simultaneously. To perform the optimization, it is convenient to introduce a coordinate-wise version of Eq. (14) for the j-th parameter $$f_j(x)=\mathcal{F}(\lambda_q, \lambda_2, \ldots, \lambda_{j-1}, x, \lambda_{j+1}, \ldots). \quad (16)$$

The optimization of the parameterized state in Eq. (15) can then be performed via a particle swarm approach [27, 28], the coordinate-wise update [29-33], or gradient based methods with the parameter-shift rule [34-39]

$$\frac{df_j(\lambda_j)}{d\lambda_j} = f_j(\lambda_j + \pi/4) - f_j(\lambda_j - \pi/4). \quad (17)$$

Best results are obtained by using the gradient based approach with the Adam optimizer [40]. Therefore, this technique is being used for the computation of all results. Each gradient calculation requires two evaluations of the coordinate-wise objective function $f_j(\lambda_j \pm \pi/4)$. On a quantum computer, $f_j$ can be determined via the Hadamard test [41]. In the numerical simulations of the present disclosure, there is emulated the measurement of the Hadamard circuit by first evaluating the exact value of $f_j$ and then sampling it using a binomial distribution with the probability $(1+f_j)/2$ and $n_f$ independent Bernoulli trials [26].

The variational approximation step significantly affects the total number of queries $N_q$ used by VQAE. In MLAE with a linearly incremental sequence, the total number of queries is equal to $$N_q = \sum_{m=1}^{M} h(2m + 1) = hM(M + 2), \quad (18)$$

where 2m+1 is the depth of the quantum circuit encoding $|Xm\rangle_{n+1}=Q^m|X0\rangle_{n+1}$. In VQAE, the total number of queries is composed of two separate contributions. The first one accounts for the sampling of the quantum circuits $|Xm\rangle_{n+1}$ and we denote it by $N_{samp}$. The second contribution corresponds to the variational approximation cost, which is denoted by $N_{var}$. It is assumed that the number of queries required per variational approximation is independent of the iteration number m and changes only as a function of the desired variational error as well as the depth of the circuit for the objective function, which is equal to 2k+2. For convenience, the cost of a single variational update for k=1 is denoted by $N_{var/1}$, so that the total number of variational queries reads $$N_{var}=N_{var/1}(2k+2)\lfloor M/k \rfloor-(k\lfloor M/k \rfloor). \quad (19)$$

The number of sampling queries is equal to $$N_{samp}=hk(k+2)\lfloor M/k \rfloor+h(M\%k)(M\%k+2), \quad (20)$$

where $\lfloor \cdot \rfloor$ denotes the floor function and % is the modulo operation. In the limit M>>k, $N_{var} \sim \mathcal{O}(M)$ and $N_{samp} \sim \mathcal{O}(kM)$. Note that both contributions scale like $\mathcal{O}(M)$ which is quadratically better than the scaling $\mathcal{O}(M^2)$ of MLAE in Eq. (18).

II-B. Naïve VQAE

In naïve implementation of the VQAE algorithm pursuant to the present disclosure, the initial state of the PQC in Eq. (15) and FIG. 7 is $|\phi_{init}\rangle_{n+1}=|0\rangle_{n+1}$.

There will first be explored the expressive power of the corresponding variational state $|\phi_{var}(\lambda)\rangle$. To this end, there are performed amplitude amplifications followed by variational approximations of the resulting state with k=1 and M=50. To evaluate the quality of the variational approximation, there is calculated the infidelity $$\mathcal{I}_m=1-\langle\phi_i|_{n+1}Q^j|Xm\rangle_{n+1}, m=i\cdot k+j, \quad (21)$$

where for k=1 we have j=0 and i=m. In FIGS. 8(a)-(b), there are shown infidelity $\mathcal{I}_m$ in Eq. (21) for the probability distributions of Eqs. (2)-(4) (see legend). In FIG. 8(a), there are shown the results of such calculations performed for different depths d of the PQC for m=10 and FIG. 8(b) shows the infidelity as a function of m for d=4. It is found that the infidelity decreases with increasing d, due to the corresponding increase of the expressive power of the PQC. The infidelity increases linearly as a function of m slowly with a slope of ≈0.00017 that is approximately the same for the three distributions. These results are obtained via naïve VQAE with k=1, M=50, and $n_s$=1000, using the numerically exact gradient without sampling and Adam with the initial learning rate β=0.1. There were considered one hundred (100) randomly initialized PQC and (a) shows one example calculation and (b) the average over all hundred (100) calculations. It is observed that the accuracy of the variational ansatz increases with the depth and saturates at d≈4. The infidelity increases linearly with m. This behaviour is seen for all probability distributions considered.

Next, there are presented the amplitude estimation results of naïve VQAE.

Figure 9:
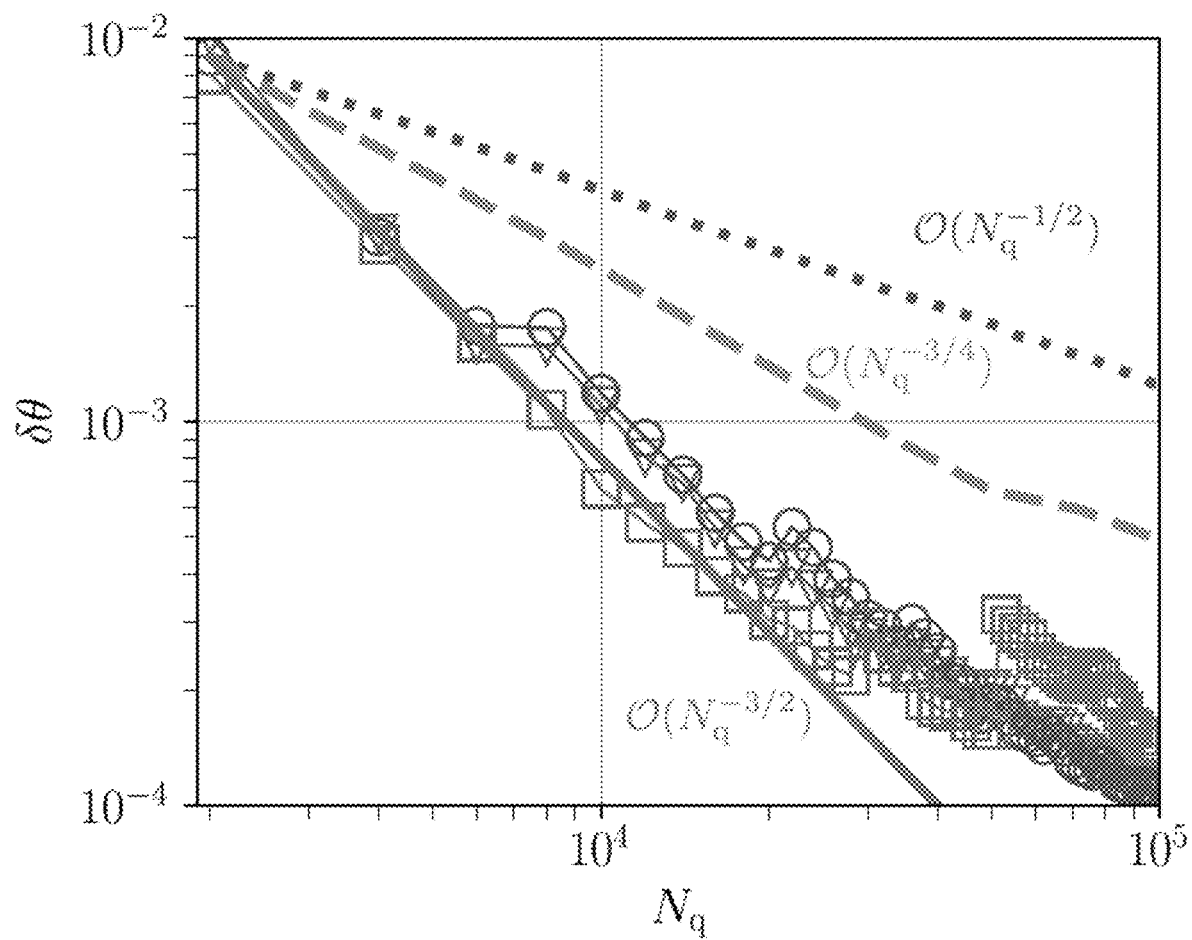
FIG. 9 is an illustration of amplitude estimation error plotted against a number of queries obtained using naïve VQAE.

In FIG. 9, there is shown amplitude estimation error δθ as a function of the number of queries $N_q$ obtained using naïve VQAE with k=1 under the assumption of zero variational cost $N_{var/1}$=0. It is observed that for small M, the error follows the ideal VQAE scaling $\delta\theta \sim \mathcal{O}(N_q^{-3/2})$ (solid gray line). For larger values of M, the scaling changes to the MC scaling $\delta\theta \sim \mathcal{O}(N_q^{-1/2})$ (dotted blue line). The result is also compared to the MLAE scaling $\delta\theta \sim \mathcal{O}(N_q^{-3/4})$ (dashed orange line). The legend as well as the simulation parameters are the same as in FIG. 8. The resulting error is compared with the one of classical MC sampling which scales $\delta\theta \sim \mathcal{O}(N_q^{-1/2})$ and the one of MLAE which scales $\delta\theta \sim \mathcal{O}(N_q^{-3/4})$. Interestingly, it is found that the convergence of $\delta\theta$ changes as a function of M. For small values of M, it follows the ideal VQAE scaling $\delta\theta \sim \mathcal{O}(N_q^{-3/2})$ as if the variational approximation is performed without error. It will be appreciated that this scaling is cubically better than the one of classical MC sampling. The second convergence regime is observed for larger values of M. In this regime, the error follows the MC scaling with $\delta\theta \sim \mathcal{O}(N_q^{-1/2})$. One can understand this new scaling in terms of a one-dimensional classical random walk with an average step of length $2\theta$ and some finite variance induced by variational approximations. Provided that the variance is much smaller than $\theta$, after $M \sim N_q$ steps the total distance of the random walk converges to the value $2M\theta$ with a relative error scaling as $\mathcal{O}(M^{-1/2})$.

Finally, there is taken into account the cost of the variational approximation, to obtain a more complete assessment of the algorithmic performance of naïve VQAE. To estimate the cost of a single variational update, there is used that $N_{var/1} = 2n_f n_s n_p$, where $n_p$ is the number of parameters of a PQC and the factor 2 comes from the two evaluations of the objective function in Eq. (17). For the PQC in FIG. 7 with d=4, the number of parameters is $n_p$=60. Additionally, there is chosen $n_f \sim n_p \sim 100$ so that $N_{var/1} \sim 1.2 \times 10^6$ and $N_{var/1} \sim 4.8 \times 10^6$ M. This large variational cost is the dominant part in the calculation of the total number of queries $N_q$. Ultimately, it leads to a performance of naïve VQAE that is worse than the one of classical MC sampling. Reducing any of $n_f$, $n_s$, or $n_p$ decreases the variational cost but also increases the variational error which then leads to a worse final amplitude estimation error.

II-C. Adaptive VQAE

To reduce the variational cost of VQAE, in this section, there is presented the adaptive VQAE algorithm. This algorithm makes use of adaptive rescaling of the function f, based on importance sampling by scaling, which is well known in statistics and commonly used in MC simulations [42].

To introduce the adaptive VQAE algorithm, there is firstly noted that the amplitude $\mathbb{E}_p[f]$ is linear in f, meaning that rescaling the function f with a proportionality constant r also rescales the amplitude a:

$$a' = \mathbb{E}_p[f'] = \mathbb{E}_p[rf] = ra. \tag{22}$$

The rescaled function f' can then be used to encode a new quantum state $|X'_0\rangle_{n+1}$, provided that $f'(x) \leq 1$ for all x, which is required for the successful state preparation via Eq. (7). Next, a new Grover operator $Q'$ can be defined and amplitude estimation can be performed to estimate the amplitude a'. To proceed further, there is made the observation that after k iterations, the overlap between the states $|X'_0\rangle_{n+1}$ and $|X'_k\rangle_{n+1} = Q'^k |X'_0\rangle_{n+1}$ is equal to $\cos(2k\theta')$. Hence, one can find a commensurate amplitude $0 \leq a' \leq 1$ and a phase $\theta'$ so that $$a' = \sin^2(\theta'), \; \theta' = \pi l/k, \; l \in \mathbb{Z}, \tag{23}$$

and the overlap between the corresponding states $|X'_0\rangle_{n+1}$ and $|X'_k\rangle_{n+1}$ is equal to one. Combining these two observations, it is concluded that for a proper choice of the renormalization factor r satisfying $rf(x) \leq 1$ for all x, it is possible to rescale the function f such that the k-th power of the corresponding Grover operator becomes the identity operator $Q'^k = \mathcal{I}$.

Finding the exact renormalization factor r requires exact knowledge of the initial amplitude a. However, as is shown in the following, a loose estimate $a_1$, obtained from a moderate number of MC samples of the initial state $|X0\rangle_{n+1}$, is sufficient. Assuming that such a loose amplitude estimate is provided, the renormalization factor can then be approximately expressed as $r_l = a'/a_1$, with a' defined as in Eq. (23). As a result, the overlap between the states $|X'_0\rangle_{n+1}$ and $|X'_k\rangle_{n+1}$ becomes $$\langle X'_0|_{n+1} |X'_k\rangle_{n+1} = \cos(\theta' - k\delta\theta') \approx 1 - \frac{(k\delta\theta')^2}{2}, \tag{24}$$

where $\delta\theta' = \theta' - \arcsin\sqrt{r_l a_1}$. It will be seen that for small deviations, the overlap decreases quadratically with k.

Next, there is used the VQAE algorithm to estimate the amplitude a' by means of the Grover operator $Q'$ and the initial state $|X'_0\rangle_{n+1}$. The variational approximation is performed at every k-th step, when the overlap between $|X'_0\rangle_{n+1}$ and $|X'_k\rangle_{n+1}$ reaches maximum. Additionally, it is assumed that the PQC has the initial state $|\phi_{init}\rangle_{n+1} = |X'_0\rangle_{n+1}$ so that the variational quantum state of Eq. (15) reads $$|\phi_{var}(\lambda)\rangle_{n+1} = \mathcal{U}_{var}(\lambda) |X'_0\rangle_{n+1}. \tag{25}$$

Having the PQC initialized to identity at the beginning of each optimization step, the only role of the variational quantum circuit is to correct the deviation of Eq. (24) originating from an imprecise value of the renormalization constant $r_l$. Finally, at the end of the calculation, an estimation of the phase $\hat{\theta}'$ corresponding to the renormalized amplitude $\hat{a}' = \sin^2\hat{\theta}'$ is obtained. To go back to the original formulation of the problem and compare the results, there is used the inverse transformation $$\hat{\theta} = \arcsin\sqrt{\hat{a}}, \; \hat{a} = \hat{a}'/r_l, \tag{26}$$

where the renormalization constant $r_l$ is exactly the same as the one used for the function rescaling. This last step concludes the adaptive VQAE algorithm.

It is beneficial to analyze the performance of the adaptive VQAE algorithm with a simplified variational ansatz consisting of only six single-qubit rotation gates and four CNOT gates, as shown in FIG. 7 in dark blue color. This simplified ansatz has only six parameters in total, which significantly reduces the number of variational queries as well as the effects of the noise due to finite sampling. It can be determined that the loose estimate of the amplitude $a_1$ via $5 \times 10^5$ MC samples. As a result, much smaller values of infidelity are achieved for $n_f$ being an order of magnitude smaller than in our naïve VQAE computations. Moreover, it will also be appreciated that for smaller values of a, the initial MC estimation of a' gets worse and, as a consequence, more sweeps are required to ensure the convergence of the variational ansatz.

Results for adaptive VQAE pursuant to the present disclosure are presented in FIG. 6, where there is shown the convergence of $\delta\theta$ as a function of $N_q$ for k=10. The simulations use Adam with the initial learning rate $\beta = 10^{-3}$, $n_f = 100$, $n_s = 100$, and $n_p = 6$, resulting in $N_{var/1} = 2n_f n_s n_p = 1.2 \times 10^5$. As in FIG. 9, there is compared with the classical MC scaling $\delta\theta \sim \mathcal{O}(N_q^{-1/2})$ and the MLAE scaling $\delta\theta \sim \mathcal{O}(N_q^{-3/4})$. The major difference of the adaptive VQAE as compared to all previously studied methods is a large starting cost which corresponds to the amount of MC samples required for the evaluation of $a_1$. This starting cost, however, represents only an additive contribution to $N_q$ and, hence, is insignificant in the regime of our interest when the number of queries gets large. Additionally, it is found that, thanks to a significant improvement of the number of query calls and the overall precision of the variational state, the resulting final error $\delta\theta$ of the adaptive VQAE algorithm surpasses the classical MC error, therefore leading to a genuine quantum advantage.

Interestingly, it is observed that in the regime of small k, the performance of the adaptive VQAE algorithm decreases. This has several reasons. Firstly, the precision of the maximum likelihood estimation decreases when the angle $\theta'=\pi l/k$ (where l=1 in our case) becomes larger than $\pi/4$, i.e., for k≤4. Hence, to perform an estimation with such small values of k, a different statistical inference technique can be considered. Secondly, for small values of k, the rescaling factor can become much larger than one and then leads to more efficient classical MC sampling. In calculations with C=0.1, this leads to a loss of quantum advantage for k=5, corresponding to r≈7.508. The quantum advantage of the adaptive VQAE algorithm holds true for other cases with k>5.

Section V. Discussion

In the present disclosure, there is provided numerical evidence that variational quantum algorithms and constant-depth quantum circuits can lead to a quantum advantage over classical MC sampling in the context of amplitude estimation. The results described are proof of concept that it is feasible, in principle, for current quantum devices to achieve a quantum advantage by performing amplitude estimation. The quantum circuits used for our numerical demonstrations, however, are still challenging for this generation of gate-based quantum computers. Therefore, an exciting next step is to find other problems and applications for which VQAE has low quantum hardware requirements and can be realized on actual quantum devices.

Future applications for VQAE are envisioned in several areas, including combinatorial optimization, quantum machine learning, and quantum chemistry. In the context of combinatorial optimization, VQAE enables the use of constant-depth quantum circuits to carry out Grover search, which can find the optimal solution with a quadratic quantum speedup over brute-force search. Optionally, a variational Grover search algorithm can benefit from filtering operators [43]. In relation to quantum machine learning, VQAE has the potential to make it possible for current quantum devices to accelerate inference in Bayesian networks [44], which can then be compared with state-of-the-art variational quantum algorithms for inference [45]. With regards to quantum chemistry, the concept of VQAE can be combined with variational quantum phase estimation (VQPE) [46-48] to realize VQPE with shallow circuits on actual quantum hardware.

It is anticipated that the efficiency of the VQAE algorithm can be further increased. Firstly, optionally, a local cost function—which can help mitigate the negative effect of barren plateaus [49]—improves the variational optimization and reduces the required number of variational queries. Secondly, the performance of our variational algorithm uses the maximum likelihood estimation procedure. Optionally, alternative approaches perform better, e.g., iterative QAE [18] or QoPrime AE [19].

Other Example Quantum Computing Systems

Figure 10:
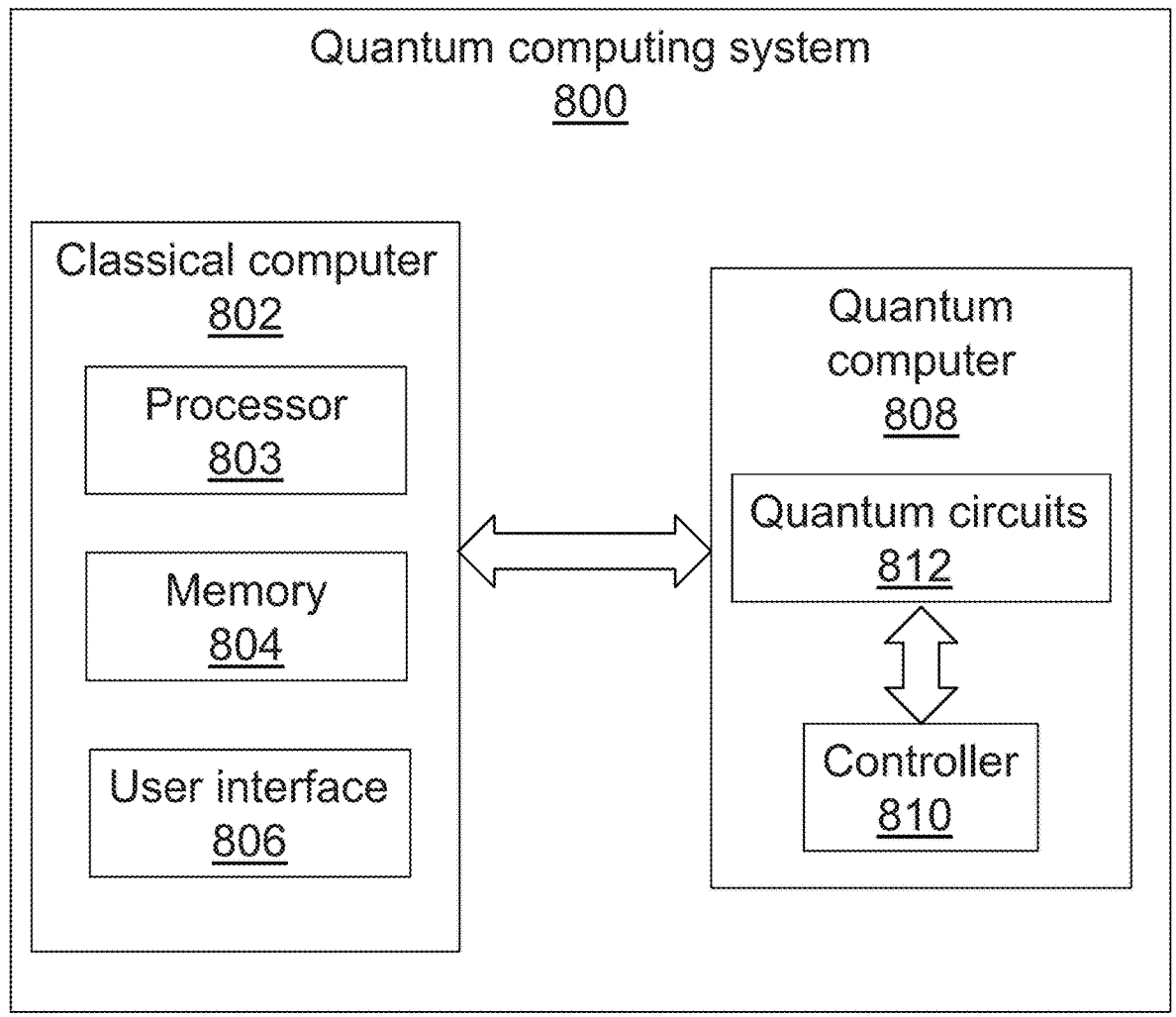
FIG. 10 is a block diagram illustrating an example quantum computing system.

FIG. 10. is block diagram that provides an illustration of an example quantum computing system 800 that includes a classical computer 802 combined with a quantum computer 808. In some cases, the classical computer 802 and the quantum computer 808, may be included or integrated in the same housing. The classical computer 802 may include a user interface 806, first hardware processor 803 and a first non-transitory memory 804. The quantum computer 808 may have a controller 810 that includes a second hardware processor and a second non-transitory memory (not shown). In some cases, the classical computer 802 may execute computer-executable instructions stored in the first non-transitory memory 804 to: control the operation of the classical computer 802, the flow of data between the classical computer 802 and the quantum computer 808, and control, at least in part, the operation of the classical computer 802. In some cases, the classical computer may send data and commands to the controller 810 and the controller 810 may configure one or more quantum circuits 812 according to the data and commands received from the classical computer 802.

Figure 11:
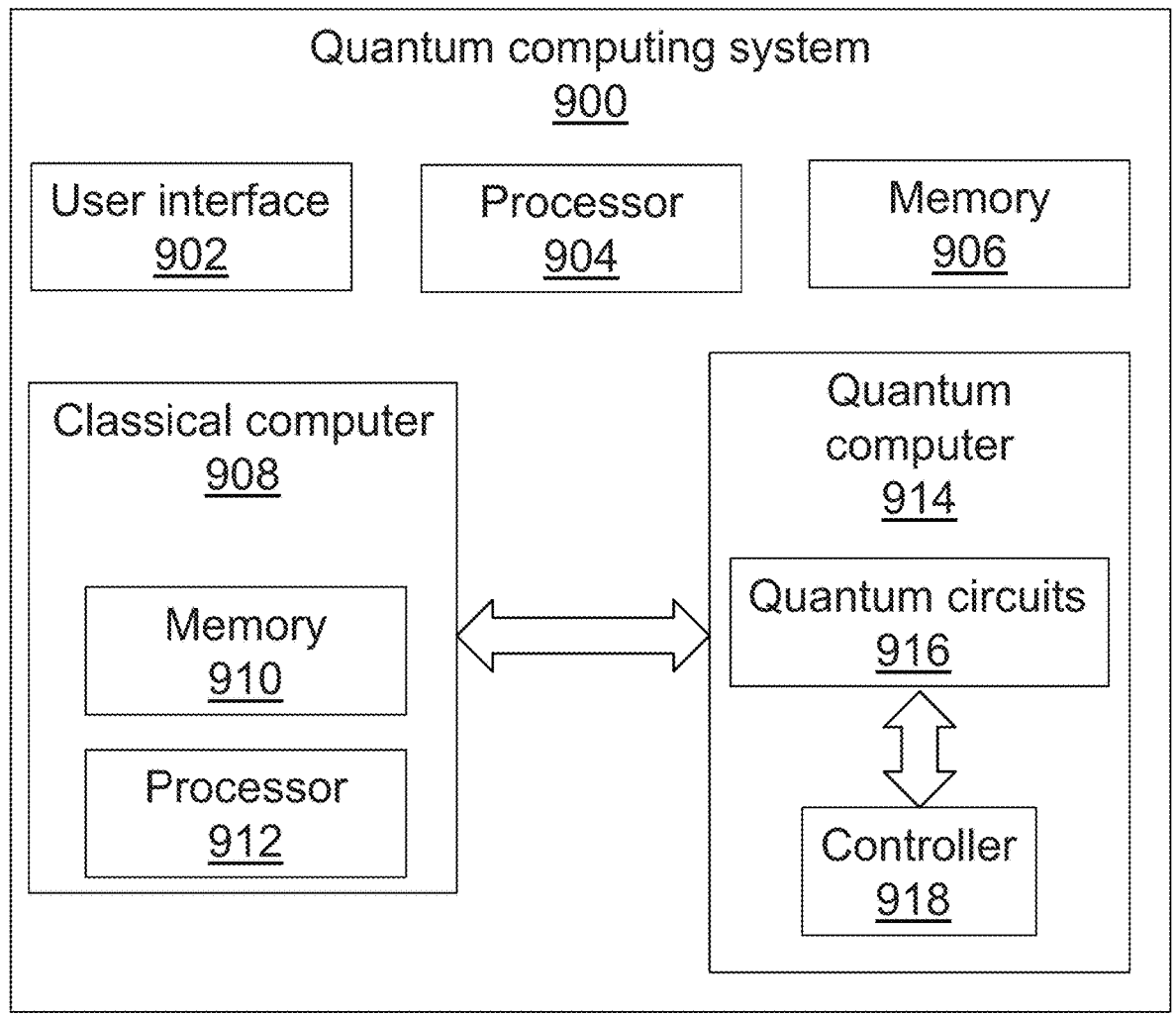
FIG. 11 is a block diagram illustrating another example quantum computing system.

FIG. 11. is block diagram that provides an illustration of an example quantum computing system 900 that includes a user interface 902, a first hardware processor 904, and a first non-transitory memory 906, a classical computer 908, and a quantum computer 914. The classical computer may include a second hardware processor 912 and a second non-transitory memory 910. The quantum computer 914 may have a controller that includes a third hardware processor and a third non-transitory memory (not shown). In some cases, the quantum computing may execute computer-executable instructions stored in the first non-transitory memory 906 to: control the operation of the classical computer 908 and the quantum computer 914, control a flow of data between the classical computer 908 and the quantum computer 914, control a flow of data between the user interface 902 and the memory 906, control a flow of data between the classical computer 908, and the quantum computer 914. In some implementations, the classical computer 908 may execute computer-executable instructions stored in the second non-transitory memory 910 to: receive input data from the user interface 902 and generate configuration data usable for configuring the quantum computer 914. In some such implementations, the controller 918 may execute computer-executable instructions stored in the third non-transitory memory to: receive configuration data from the classical computer 908, configure the quantum circuits 916 according to configuration data, and execute a quantum algorithm using the configured quantum circuits 916. In various implementations, the controller 918 may receive the quantum algorithm and/or commands associated with the quantum algorithm from the user interface memory 906, the memory 910, the processor 912, or the processor 904.

Figure 12:
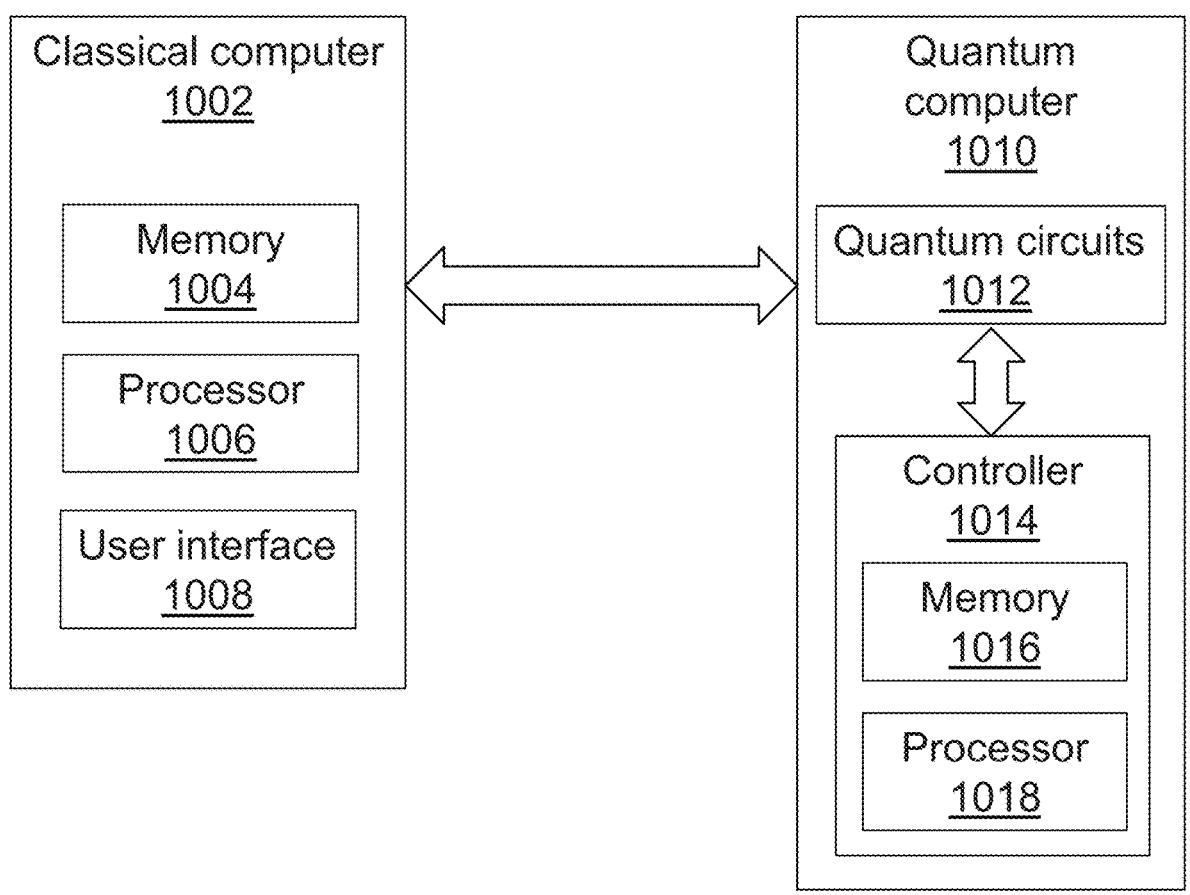
FIG. 12 is a block diagram illustrating another example quantum computing system.

FIG. 12. is a block diagram that provides an illustration of an example distributed quantum computing system 1000 that includes a classical computer 1002 and a quantum computer 1010 where the classical computer 1002 and the quantum computer 1010 are separate systems. In some cases, the classical computer 1002 and the quantum computer 1010 can be in communication via a data link. The data link can be a wired or wireless data link. The wireless data link may comprise a local area network (LAN), a Wi-Fi connection, or a wide area network (WLAN).

The classical computer may include a first hardware processor 1006, a first non-transitory memory 1004, and a user interface 1008. The quantum computer 1010 may include a controller 1014 that includes a second hardware processor 1018 and a second non-transitory memory 1016. The Controller 1014 can be configured to construct and/or configure quantum circuits 1012 based at least in part on data (e.g., configuration data) received from the classical computer 1002 via the communication link. In some implementations, the classical computer 1002 may execute computer-executable instructions stored in the first non-transitory memory 1004 to: receive input data from the user interface 1008 and generate configuration data usable for configuring the quantum computer 1010 (e.g., by the controller 1014 of the quantum computer 1010). In some such implementations, the controller 1014 may execute computer-executable instructions stored in the second non-transitory memory 1016 to: receive configuration data from the classical computer 1002, configure the quantum circuits 1012 according to configuration data, and execute a quantum algorithm using the configured quantum circuits 1012. In various implementations, the controller 1014 may receive the quantum algorithm and/or commands associated with the quantum algorithm from the classical computer 1002. In some examples, at least a portion of the quantum algorithms may be stored in the memory 1016.

In some cases, the quantum computer can be a quantum computer based on any quantum computing technology (e.g., trapped ions, photons, superconducting circuits, and the like).

In some cases, a quantum computer (e.g., the quantum computer 808, 914, or 1010) may comprise a plurality of quantum computers interconnected, for example, using quantum communication channels and/or shared entanglement.

EXAMPLE EMBODIMENTS

Some additional nonlimiting examples of embodiments discussed above are provided below. These should not be read as limiting the breadth of the disclosure in any way.

Group 1

Example 1. A quantum computing system configured to perform a quantum computational task, the quantum computing system comprising:
 a quantum computer comprising:
 an array of qubits;
 at least one quantum circuit comprising one or more quantum gates configured to act on the qubits to generate processed qubits; and
 at least one measuring device configured to determine states of the processed qubits to generate measurement data; and
 a classical computing system in communication with the quantum computer, the classical computing system comprising a non-transitory memory configured to store specific computer-executable instructions and a hardware processor in communication with the non-transitory memory, wherein the hardware processor is configured to execute the specific computer-executable instructions to at least:
 receive input data,
 prepare the array of qubits based at least in part on the input data;
 configure the at least one quantum circuit, based at least in part on the input data, to execute at least a series of quantum operations on the array of qubits to generate final processed qubits;
 perform at least a first variational approximation after at least a first sequence of quantum operations of the series of quantum operations, to generate a first variational quantum state based at least in part on the measurement data generated after the first sequence of quantum operations;
 execute, using at least the first variational quantum state, at least a second sequence of quantum operations of the series of quantum operations to generate the final processed qubits; and
 generate output data using the final processed qubits;
 wherein performing the first variational approximation reduces quantum noise arising from performing the quantum computational task and generating the output data compared to quantum noise arising from performing the quantum computational task and generating the output data without performing the first variational approximation.

Example 2. The quantum computing system of Example 1, wherein the first variational approximation comprises determining a quantum state of the array of qubits based at least a portion of the measurement data and determining the first variational quantum state by variationally approximating the determined quantum state.

Example 3. The quantum computing system of Example 1, wherein the output data has an error less than a threshold error.

Example 4. The quantum computing system of Example 3, wherein the quantum computational task comprises quantum amplitude estimation (QAE), the output data comprises an estimated amplitude, and the error comprises an amplitude estimation error.

Example 5. The quantum computing system of Example 1, wherein the first variational quantum state comprises a parametrized quantum circuit (PQC) determined using a PQC ansatz.

Example 6. The quantum computing system of Example 1, wherein the hardware processor is further configured to perform an adaptive rescaling algorithm to reduce a variational cost of the first variational approximation.

Example 7. The quantum computing system of Example 6, wherein the input data comprises at least a real valued function and a probability distribution.

Example 8. The quantum computing system of any of Examples 1 or 7, wherein the input data comprises a number of quantum operations in the first sequence of quantum operations.

Example 9. The quantum computing system of Example 7, wherein hardware processor performs the adaptive rescaling algorithm to rescale the real valued function.

Example 10. A quantum computing system of Example 1, wherein a maximum circuit depth of the at least one quantum circuit for performing the quantum computational task is independent of a number of quantum operations in the series of the quantum operations.

Example 11. The quantum computing system of Example 1, wherein the input data is representative of sensed data from a physical system, and the output data is representative of a state or a characteristic of the physical system.

Example 12. The quantum computing system of Example 1, wherein the first variational approximation comprises a gradient based approximation using an Adam optimizer.

Example 13. The quantum computing system of Example 1, wherein the hardware processor executes the second sequence of quantum operations, by applying the second sequence of quantum operations on the first variational quantum state.

Example 14. The quantum computing system of any of Examples 1 or 13, wherein the first and the second sequences of quantum operations comprise a same number of quantum operations.

Example 15. The quantum computing system of any of Examples 1 or 4, wherein the first sequence of quantum operations comprises a maximum likelihood amplitude estimation (MLAE).

Example 16. The quantum computing system of Example 15, wherein the MLAE is implemented as an iterative process applied to the array of qubits.

Example 17. The quantum computing system of Example 16, wherein an iteration of the iterative process comprises at least the MLAE and the first variational approximation.

Example 18. The quantum computing system of Example 1, wherein the series of quantum operations comprise at least one Grover operator.

Example 19. The quantum computing system of Example 1, wherein the first sequence of the quantum operations comprises a sequence of Grover operators.

Example 20. The quantum computing system of Example 1, wherein the classical computing system comprises a control system of the quantum computer.

Example 21. A method for operating a computing system comprising a quantum computer having an array of qubits, a non-transitory memory configured to store specific computer-executable instructions, and a hardware processor in communication with the non-transitory memory, the method comprising:
  by the hardware processor of the computing system:
  receiving input data,
  preparing the array of qubits based at least in part on the input data;
  configuring a quantum circuit in the quantum computer, based at least in part on the input data, to execute at least a series of quantum operations on the array of qubits to generate final processed qubits;
  performing at least a first variational approximation, after at least a first sequence of quantum operations of the series of quantum operations, to generate a first variational quantum state based at least in part on a measured quantum state of the array of qubits after the first sequence of quantum operations;
  executing, using the first variational quantum state, at least a second sequence of quantum operations of the series of quantum operations to generate the final processed qubits; and
  generating output data using the final processed qubits;
  wherein operating the computing system comprises performing a quantum computational task;
  wherein performing the quantum computational task comprises at least executing the series of quantum operations; and
  wherein performing the first variational approximation reduces quantum noise arising from performing the quantum computational task and generating the output data compared to quantum noise arising from performing the quantum computational task and generating the output data without performing the first variational approximation.

Example 22. The method of Example 21, wherein performing the first variational approximation comprises:
  determining states of processed qubits to generate measurement data, and
  determining a quantum state of the array of qubits based at least a portion of the measurement data and determining the first variational quantum state by variationally approximating the determined quantum state.

Example 23. The method of Example 21, wherein the output data has an error less than a threshold error.

Example 24. The method of Example 23, wherein performing the quantum computational task comprises performing a quantum amplitude estimation (QAE), the output data comprises an estimated amplitude, and the error comprises an amplitude estimation error.

Example 25. The method of Example 21, wherein the first variational quantum state comprises a parametrized quantum circuit (PQC) determined using a PQC ansatz.

Example 26. The method of Example 21, further comprising performing an adaptive rescaling algorithm to reduce a variational cost of the first variational approximation.

Example 27. The method of Example 26, wherein the input data comprises at least a real valued function and a probability distribution.

Example 28. The method of any of Examples 21 or 27, wherein the input data comprises a number of quantum operations in the first sequence of quantum operations.

Example 29. The method of Example 27, wherein performing the adaptive rescaling algorithm comprises rescaling the real valued function.

Example 30. The method of Example 21, wherein a maximum circuit depth of the quantum circuit for performing the quantum computational task is independent of a number of quantum operations in the series of the quantum operations.

Example 31. The method of Example 21, wherein the input data is representative of sensed data from a physical system, and the output data is representative of a state or a characteristic of the physical system.

Example 32. The method of Example 21, wherein performing the first variational approximation comprises performing a gradient based approximation using Adam optimizer.

Example 33. The method of Example 21, wherein executing the second sequence of quantum operations comprises applying the second sequence of quantum operations on the first variational quantum state.

Example 34. The method of Example 33, wherein the first and the second of quantum operations comprise a same number of quantum operations.

Example 35. The method of Example 21 wherein the first sequence of quantum operations comprises a maximum likelihood amplitude estimation (MLAE).

Example 36. The method of Example 35, wherein the MLAE is implemented as an iterative process applied to the array of qubits.

Example 37. The method of Example 36, wherein an iteration of the iterative process comprises at least the MLAE and the first variational approximation.

Example 38. The method of Example 21, wherein the series of quantum operations comprise at least one Grover operator.

Example 39. The method of Example 21, wherein the first sequence of quantum operations comprises a sequence of Grover operators.

Example 40. A non-transitory computer-readable storage medium comprising specific computer-readable instructions executable on data processing hardware, wherein the specific computer-readable instructions, when executed the data processing hardware, implement the method of any one of Examples 21 to 39.

Group 2

Example 1. A quantum computing system configured to perform a computational task, the quantum computing system comprising:
 a control system configured to receive input data and generate output data using final measurement data,
 a quantum computer comprising:
  an array of qubits configured to be provided with initial values based at least in part on the input data;
  a quantum circuit configured to execute a series of quantum operations on the array of qubits to generate corresponding processed qubits; and
  a measuring device configured to determine states of final processed qubits to generate the final measurement data,
 wherein the quantum computing system is configured to perform at least one variational quantum approximation process after at least a first sequence of quantum operations of the series of quantum operations to reduce an effect of quantum noise that arises when performing the computational task and generating the output data.

Example 2. The quantum computing system of Example 1, wherein the input data is representative of sensed data from a physical system, and the output data is representative of a state or a characteristic of the physical system.

Example 3. The quantum computing system of Examples 1 or 2, wherein the quantum computing system is further configured to perform an adaptive rescaling algorithm, wherein the adaptive rescaling algorithm is adaptive at least to characteristics of the first sequence of the series of operations when applied to the array of qubits and to characteristics of the measuring device when determining the states of processed qubits generated by the first sequence of the quantum operations.

Example 4. The quantum computing system any of Examples 1 or 3, wherein the first sequence of quantum operations comprises a maximum likelihood amplitude estimation process.

Example 5. The quantum computing system of Example 4, wherein the maximum likelihood process is implemented as an iterative process applied to the array of qubits.

Example 6. The quantum computing system of Example 5, wherein an iteration of the iterative process comprises the maximum likelihood process and the at least one variational quantum approximation.

Example 7. A method for operating a computing system comprising at least one quantum circuit and at least one control system, to perform a computational task, the method comprising, the method comprising, by the control system:
 receiving input data;
 arranging for the quantum circuit to include an array of qubits that is configured to be provided with initial values depending on input data supplied in use to the quantum computer;
 configuring the quantum circuit to execute a series of quantum operations on the array of qubits to generate corresponding processed qubits, and to perform at least one variational quantum approximation process after at least a first sequence of quantum operations of the series of quantum operations;
 using a measuring device to determine states of final processed qubits to generate final measurement data; and
 generating output data using the final measurement data,
 wherein performing at least one variational quantum approximation process reduces an effect of quantum noise that arises when performing the computational task and generating the output data.

Example 8. The method of Example 7, wherein the input data representative of sensed data from a physical system, and the output data from the quantum computer is representative of a state or a characteristic of the physical system.

Example 9. The method of Example 7 or 8, wherein the method further comprises performing an adaptive rescaling algorithm, wherein the adaptive rescaling algorithm is adaptive variational amplitude estimation process that is adaptive to at least characteristics of the first sequence of operations when applied to the qubits and to characteristics of the measuring device when determining the states of the processed qubits.

Example 10. The method of Example 7, wherein the first sequence of quantum operations comprises a maximum likelihood.

Example 11. The method of Example 10, wherein the maximum likelihood process is implemented as an iterative process applied to the array of qubits.

Example 12. A non-transitory computer-readable storage medium comprising specific computer-readable instructions executable on data processing hardware, wherein the specific computer-readable instructions, when executed the data processing hardware, implement the method of any one of Examples 7 to 11.

Group 3

Example 1. A quantum computer including:
 an array of qubits that is configured to be provided with initial values depending on input data supplied in use to the quantum computer;
 a quantum computing arrangement that is configured to execute a sequence of quantum operations on the array of qubits to generate corresponding processed qubits; and
 a measuring device for determining states of the processed qubits to generate output data from the quantum computer, characterized in that the quantum computer is configured to use a variational quantum amplitude estimation process in at least one of the sequence of operations and the measuring device when determining the states of the processed qubits to reduce an effect of quantum noise that arises when executing the sequence of quantum operations on the qubits and determining the states of the processed qubits.

Example 2. A quantum computer of Example 1, wherein the quantum computer is configured to receive the input data representative of sensed data from a physical system, and the sequence of quantum operations is arranged to process the qubits so that the output data from the quantum computer is representative of state or characteristic of the physical system.

Example 3. A quantum computer of Example 1 or 2, wherein the variational quantum amplitude estimation process is implemented as an adaptive variational amplitude estimation process that is adaptive to characteristics of the sequence of operations when applied to the qubits and to characteristics of the measuring device when determining the states of the processed qubits.

Example 4. A quantum computer of Example 3, wherein the adaptive variational amplitude estimation process includes a maximum likelihood process for learning characteristics of the sequence of operations when applied to the qubits and to characteristics of the measuring device when determining the states of the processed qubits.

Example 5. A quantum computer of Example 4, wherein the maximum likelihood process is implemented as an iterative process applied to the qubits of the quantum computer.

Example 6. A method for operating a quantum computer, characterized in that the method includes:
  arranging for the quantum computer to include an array of qubits that is configured to be provided with initial values depending on input data supplied in use to the quantum computer;
  configuring a quantum computing arrangement to execute a sequence of quantum operations on the array of qubits to generate corresponding processed qubits; and
  using a measuring device to determine states of the processed qubits to generate output data from the quantum computer,
  characterized in that the method further includes configuring the quantum computer to use a variational quantum amplitude estimation process in at least one of the sequence of operations and the measuring device when determining the states of the processed qubits to reduce an effect of quantum noise that arises when executing the sequence of quantum operations on the qubits and determining the states of the processed qubits.

Example 7. A method of Example 6, wherein the method incudes configuring the quantum computer to receive the input data representative of sensed data from a physical system and arranging for the sequence of quantum operations to process the qubits so that the output data from the quantum computer is representative of state or characteristic of the physical system.

Example 8. A method of Example 6 or 7, wherein the method includes implementing the variational quantum amplitude estimation process as an adaptive variational amplitude estimation process that is adaptive to characteristics of the sequence of operations when applied to the qubits and to characteristics of the measuring device when determining the states of the processed qubits.

Example 9. A method of Example 8, wherein the method includes arranging for the adaptive variational amplitude estimation process to include a maximum likelihood process for learning characteristics of the sequence of operations when applied to the qubits and to characteristics of the measuring device when determining the states of the processed qubits.

Example 10. A method of Example 9, wherein the maximum likelihood process is implemented as an iterative process applied to the qubits of the quantum computer.

Example 11. A computer program product comprising a non-transitory computer-readable storage medium having computer-readable instructions stored thereon, the computer-readable instructions being executable by a computerized device comprising processing hardware to execute the method of any one of Examples 6 to 10.

Terminology

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural; as an example, "at least one of" indicates "one of" in an example, and "a plurality of" in another example; moreover, "two of", and similarly "one or more" are to be construed in a likewise manner Numerals included within parentheses in the accompanying claims are intended to assist understanding of the claims and should not be construed in any way to limit subject matter claimed by these claims.

The phrases "in an embodiment", "according to an embodiment" and the like generally mean the particular feature, structure, or characteristic following the phrase is included in at least one embodiment of the present disclosure and may be included in more than one embodiment of the present disclosure. Importantly, such phrases do not necessarily refer to the same embodiment.

The term "computer" or "computing-based device" is used herein to refer to any device with processing capability such that it executes instructions. Those skilled in the art will realize that such processing capabilities are incorporated into many different devices and therefore the terms "computer" and "computing-based device" each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible, non-transitory storage medium, e.g., in the form of a computer program comprising computer program code adapted to perform the operations of one or more of the methods described herein when the program is run on a computer and where the computer program may be embodied on a non-transitory computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed or execute some software instructions at the local terminal and some at the remote computer (or computer network). Those skilled in the art will also realize that by utilizing techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. No single feature or group of features is necessary or indispensable to every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, blocks, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A; B; C; A and B; A and C; B and C; and A, B, and C. Conjunctive language such as the phrase "at least one of X, Y, and Z," unless specifically stated otherwise, is otherwise understood with the context as used in general to convey that an item, term, etc. may be at least one of X, Y, or Z. Thus, such conjunctive language is not generally intended to imply that certain embodiments require at least one of X, at least one of Y, and at least one of Z to each be present.

The operations of the methods described herein may be carried out in any suitable order, or simultaneously where appropriate. Additionally, individual blocks may be deleted from, combined with other blocks, or rearranged in any of the methods without departing from the scope of the subject matter described herein. Aspects of any of the examples described above may be combined with aspects of any of the other examples described to form further examples without losing the effect sought.

It will be understood that the above description is given by way of example only and that various modifications may be made by those skilled in the art. The above specification, examples, and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

REFERENCES

[1] G. Brassard, P. Hoyer, M. Mosca, and A. Tapp, Quantum amplitude amplification and estimation, Contemp. Math. 305, 53 (2002).

[2] A. Montanaro, Quantum speedup of Monte Carlo methods, Proc. Math. Phys. Eng. Sci. 471 (2015).

[3] E. Knill, G. Ortiz, and R. D. Somma, Optimal quantum measurements of expectation values of observables, Phys. Rev. A 75, 012328 (2007).

[4] I. Kassal, S. P. Jordan, P. J. Love, M. Mohseni, and A. Aspuru-Guzik, Polynomial-time quantum algorithm for the simulation of chemical dynamics, Proc. Natl. Acad. Sci. USA 105, 18681 (2008).

[5] N. Wiebe, A. Kapoor, and K. M. Svore, Quantum Algorithms for Nearest-Neighbor Methods for Supervised and Unsupervised Learning, Quantum Info. Comput. 15, 316 (2015).

[6] N. Wiebe, A. Kapoor, and K. M. Svore, Quantum Deep Learning, Quantum Info. Comput. 16, 541 (2016).

[7] I. Kerenidis, J. Landman, A. Luongo, and A. Prakash, qmeans: A quantum algorithm for unsupervised machine learning, Adv. Neural Inf. Process. Syst. 32 (2019).

[8] R. Orús, S. Mugel, and E. Lizaso, Quantum computing for finance: Overview and prospects, Rev. Phys. 4, 100028 (2019).

[9] D. J. Egger, C. Gambella, J. Marecek, S. McFaddin, M. Mevissen, R. Raymond, A. Simonetto, S. Woerner, and E. Yndurain, Quantum Computing for Finance: State-of-the-Art and Future Prospects, IEEE Trans. Quantum Eng. 1, 1 (2020).

[10] A. Bouland, W. van Dam, H. Joorati, I. Kerenidis, and A. Prakash, Prospects and challenges of quantum finance, arXiv:2011.06492 (2020).

[11] S. Woerner and D. J. Egger, Quantum risk analysis, npj Quantum Inf. 5, 15 (2019).

[12] M. C. Braun, T. Decker, N. Hegemann, S. F. Kerstan, and C. Schäfer, A Quantum Algorithm for the Sensitivity Analysis of Business Risks, arXiv:2103.05475 (2021).

[13] P. Rebentrost, B. Gupt, and T. R. Bromley, Quantum computational finance: Monte Carlo pricing of financial derivatives, Phys. Rev. A 98, 022321 (2018).

[14] N. Stamatopoulos, D. J. Egger, Y. Sun, C. Zoufal, R. Iten, N. Shen, and S. Woerner, Option Pricing using Quantum Computers, Quantum 4, 291 (2020).

[15] Y. Suzuki, S. Uno, R. Raymond, T. Tanaka, T. Onodera, and N. Yamamoto, Amplitude estimation without phase estimation, Quantum Inf. Process. 19, 75 (2020).

[16] T. Tanaka, Y. Suzuki, S. Uno, R. Raymond, T. Onodera, and N. Yamamoto, Amplitude estimation via maximum likelihood on noisy quantum computer, arXiv: 2006.16223 (2020).

[17] S. Aaronson and P. Rall, Quantum approximate counting, simplified, in Symposium on Simplicity in Algorithms (SIAM, 2020) pp. 24-32.

[18] D. Grinko, J. Gacon, C. Zoufal, and S. Woerner, Iterative quantum amplitude estimation, npj Quantum Inf. 7, 1 (2021).

[19] T. Giurgica-Tiron, I. Kerenidis, F. Labib, A. Prakash, and W. Zeng, Low depth algorithms for quantum amplitude estimation, arXiv:2012.03348 (2020).

[20] S. Herbert, Quantum Monte-Carlo Integration: The Full Advantage in Minimal Circuit Depth, arXiv:2105.09100 (2021).

[21] M. Benedetti, E. Lloyd, S. Sack, and M. Fiorentini, Parameterized quantum circuits as machine learning models, Quantum Sci. Technol. 4, 043001 (2019).

[22] M. Cerezo, A. Arrasmith, R. Babbush, S. C. Benjamin, S. Endo, K. Fujii, J. R. McClean, K. Mitarai, X. Yuan, L. Cincio, and P. J. Coles, Variational Quantum Algorithms, arXiv:2012.09265 (2020).

[23] K. Bharti, A. Cervera-Lierta, T. H. Kyaw, T. Haug, S. Alperin-Lea, A. Anand, M. Degroote, H. Heimonen, J. S. Kottmann, T. Menke, W.-K. Mok, S. Sim, L.-C. Kwek, and A. Aspuru-Guzik, Noisy intermediate-scale quantum (NISQ) algorithms, arXiv:2101.08448 (2021).

[24] G. Brassard and P. Hoyer, An exact quantum polynomial-time algorithm for Simon's problem, in Proceedings of the Fifth Israeli Symposium on Theory of Computing and Systems (IEEE, 1997) pp. 12-23.

[25] L. K. Grover, Quantum computers can search rapidly by using almost any transformation, Phys. Rev. Lett. 80, 4329 (1998).

[26] W. H. Press, S. A. Teukolsky, W. T. Vetterling, and B. P. Flannery, Numerical Recipes in C (Cambridge University Press, New York, USA, 1992).

[27] J. Kennedy and R. Eberhart, Particle swarm optimization, in Proceedings of ICNN'95 - International Conference on Neural Networks, Vol. 4 (1995) pp. 1942-1948.

[28] M. R. Bonyadi and Z. Michalewicz, Particle Swarm Optimization for Single Objective Continuous Space Problems: A Review, Evol. Comput. 25, 1 (2017).

[29] J. Gil Vidal and D. O. Theis, Calculus on parameterized quantum circuits, arXiv:1812.06323 (2018).

[30] R. M. Parrish, J. T. Iosue, A. Ozaeta, and P. L. McMahon, A Jacobi Diagonalization and Anderson Acceleration Algorithm For Variational Quantum Algorithm Parameter Optimization, arXiv:1904.03206 (2019).

[31] K. M. Nakanishi, K. Fujii, and S. Todo, Sequential minimal optimization for quantum-classical hybrid algorithms, Phys. Rev. Research 2, 043158 (2020).

[32] M. Ostaszewski, E. Grant, and M. Benedetti, Structure optimization for parameterized quantum circuits, Quantum 5, 391 (2021).

[33] M. Benedetti, M. Fiorentini, and M. Lubasch, Hardware-efficient variational quantum algorithms for time evolution, Phys. Rev. Research 3, 033083 (2021).

[34] E. Hazan, K. Y. Levy, and S. Shalev-Shwartz, Beyond convexity: Stochastic quasi-convex optimization, arXiv:1507.02030 (2015).

[35] Y. Suzuki, H. Yano, R. Raymond, and N. Yamamoto, Normalized Gradient Descent for Variational Quantum Algorithms, arXiv:2106.10981 (2021).

[36] J. Li, X. Yang, X. Peng, and C.-P. Sun, Hybrid Quantum-Classical Approach to Quantum Optimal Control, Phys. Rev. Lett. 118, 150503 (2017).

[37] K. Mitarai, M. Negoro, M. Kitagawa, and K. Fujii, Quantum circuit learning, Phys. Rev. A 98, 032309 (2018).

[38] M. Schuld, V. Bergholm, C. Gogolin, J. Izaac, and N. Killoran, Evaluating analytic gradients on quantum hardware, Phys. Rev. A 99, 032331 (2019).

[39] L. Banchi and G. E. Crooks, Measuring analytic gradients of general quantum evolution with the stochastic parameter shift rule, Quantum 5, 386 (2021).

[40] D. P. Kingma and J. Ba, Adam: A Method for Stochastic Optimization, arXiv:1412.6980 (2014).

[41] D. Aharonov, V. Jones, and Z. Landau, A polynomial quantum algorithm for approximating the Jones polynomial, Algorithmica 55, 395 (2009).

[42] B. Arouna, Adaptative Monte Carlo Method, A Variance Reduction Technique, Monte Carlo Methods Appl. 10, 1 (2004).

[43] D. Amaro, C. Modica, M. Rosenkranz, M. Fiorentini, M. Benedetti, and M. Lubasch, Filtering variational quantum algorithms for combinatorial optimization, arXiv:2106.10055 (2021).

[44] G. H. Low, T. J. Yoder, and I. L. Chuang, Quantum inference on Bayesian networks, Phys. Rev. A 89, 062315 (2014).

[45] M. Benedetti, B. Coyle, M. Fiorentini, M. Lubasch, and M. Rosenkranz, Variational inference with a quantum computer, arXiv:2103.06720 (2021).

[46] R. M. Parrish and P. L. McMahon, Quantum Filter Diagonalization: Quantum Eigendecomposition without Full Quantum Phase Estimation, arXiv:1909.08925 (2019).

[47] N. H. Stair, R. Huang, and F. A. Evangelista, A Multireference Quantum Krylov Algorithm for Strongly Correlated Electrons, J. Chem. Theory Comput. 16, 2236 (2020).

[48] K. Klymko, C. Mejuto-Zaera, S. J. Cotton, F. Wudarski, M. Urbanek, D. Hait, M. Head-Gordon, K. B. Whaley, J. Moussa, N. Wiebe, W. A. de Jong, and N. M. Tubman, Real time evolution for ultracompact Hamiltonian eigenstates on quantum hardware, arXiv:2103.08563 (2021).

[49] M. Cerezo, A. Sone, T. Volkoff L. Cincio, and P. J. Coles, Cost function dependent barren plateaus in shallow parameterized quantum circuits, Nat. Commun. 12, 1791 (2021).

What is claimed is:

1. A quantum computing system configured to perform a quantum computational task, the quantum computing system comprising:
a quantum computer comprising:
an array of qubits;
at least one quantum circuit comprising one or more quantum gates configured to act on the qubits to generate processed qubits; and
at least one measuring device configured to determine states of the processed qubits to generate measurement data; and
a classical computing system in communication with the quantum computer, the classical computing system comprising a non-transitory memory configured to store specific computer-executable instructions and a hardware processor in communication with the non-transitory memory, wherein the hardware processor is configured to execute the specific computer-executable instructions to at least:
receive input data,
prepare the array of qubits based at least in part on the input data;
configure the at least one quantum circuit, based at least in part on the input data, to execute at least a series of quantum operations on the array of qubits to generate final processed qubits;
perform at least a first variational approximation after at least a first sequence of quantum operations of the series of quantum operations, to generate a first variational quantum state based at least in part on the measurement data generated after the first sequence of quantum operations;

execute, using at least the first variational quantum state, at least a second sequence of quantum operations of the series of quantum operations to generate the final processed qubits; and generate output data using the final processed qubits;

wherein performing the first variational approximation reduces quantum noise arising from performing the quantum computational task and generating the output data compared to quantum noise arising from performing the quantum computational task and generating the output data without performing the first variational approximation.

2. The quantum computing system of claim 1, wherein the first variational approximation comprises determining a quantum state of the array of qubits based at least a portion of the measurement data and determining the first variational quantum state by variationally approximating the determined quantum state.

3. The quantum computing system of claim 1, wherein the output data has an error less than a threshold error, wherein a number of sequences in the series of quantum operations is determined based at least in part on the threshold error.

4. The quantum computing system of claim 3, wherein the quantum computational task comprises quantum amplitude estimation (QAE), the output data comprises an estimated amplitude, and the error comprises an amplitude estimation error.

5. The quantum computing system of claim 1, wherein the first variational quantum state comprises a parametrized quantum circuit (PQC) determined using a PQC ansatz.

6. The quantum computing system of claim 1, wherein the hardware processor is further configured to perform an adaptive rescaling algorithm to reduce a variational cost of the first variational approximation.

7. The quantum computing system of claim 1, wherein the input data comprises a number of quantum operations in the first sequence of quantum operations.

8. A quantum computing system of claim 1, wherein a maximum circuit depth of the at least one quantum circuit for performing the quantum computational task is independent of a number of quantum operations in the series of the quantum operations.

9. The quantum computing system of claim 1, wherein the first sequence of quantum operations comprises a maximum likelihood amplitude estimation (MLAE).

10. The quantum computing system of claim 9, wherein the MLAE is implemented as an iterative process applied to the array of qubits, and an iteration of the iterative process comprises at least the MLAE and the first variational approximation.

11. A method for operating a computing system comprising a quantum computer having an array of qubits, a non-transitory memory configured to store specific computer-executable instructions, and a hardware processor in communication with the non-transitory memory, the method comprising:

by the hardware processor of the computing system:
receiving input data,
preparing the array of qubits based at least in part on the input data;
configuring a quantum circuit in the quantum computer, based at least in part on the input data, to execute at least a series of quantum operations on the array of qubits to generate final processed qubits;
performing at least a first variational approximation, after at least a first sequence of quantum operations of the series of quantum operations, to generate a first variational quantum state based at least in part on a measured quantum state of the array of qubits after the first sequence of quantum operations;
executing, using the first variational quantum state, at least a second sequence of quantum operations of the series of quantum operations to generate the final processed qubits; and
generating output data using the final processed qubits;
wherein operating the computing system comprises performing a quantum computational task;
wherein performing the quantum computational task comprises at least executing the series of quantum operations; and
wherein performing the first variational approximation reduces quantum noise arising from performing the quantum computational task and generating the output data compared to quantum noise arising from performing the quantum computational task and generating the output data without performing the first variational approximation.

12. The method of claim 11, wherein performing the first variational approximation comprises:
determining states of processed qubits to generate measurement data, and
determining a quantum state of the array of qubits based at least a portion of the measurement data and determining the first variational quantum state by variationally approximating the determined quantum state.

13. The method of claim 11, wherein the output data has an error less than a threshold error.

14. The method of claim 13, wherein performing the quantum computational task comprises performing a quantum amplitude estimation (QAE), the output data comprises an estimated amplitude, and the error comprises an amplitude estimation error.

15. The method of claim 11, wherein the first variational quantum state comprises a parametrized quantum circuit (PQC) determined using a PQC ansatz.

16. The method of claim 11, further comprising performing an adaptive rescaling algorithm to reduce a variational cost of the first variational approximation.

17. The method of claim 11, wherein the input data comprises a number of quantum operations in the first sequence of quantum operations.

18. The method of claim 11, wherein a maximum circuit depth of the quantum circuit for performing the quantum computational task is independent of a number of quantum operations in the series of the quantum operations.

19. The method of claim 11 wherein the first sequence of quantum operations comprises a maximum likelihood amplitude estimation (MLAE).

20. A non-transitory computer-readable storage medium comprising specific computer-readable instructions executable on data processing hardware, wherein the specific computer-readable instructions, when executed the data processing hardware, implement the method of claim 11.

* * * * *